US008838440B2

(12) United States Patent
Iwama et al.

(10) Patent No.: US 8,838,440 B2
(45) Date of Patent: Sep. 16, 2014

(54) GENERATING PARSER COMBINATION BY COMBINING LANGUAGE PROCESSING PARSERS

(75) Inventors: Futoshi Iwama, Kanagawa-ken (JP); Taiga Nakamura, Kanagawa-ken (JP); Hironori Takeuchi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 13/231,015

(22) Filed: Sep. 13, 2011

(65) Prior Publication Data
US 2012/0065960 A1 Mar. 15, 2012

(30) Foreign Application Priority Data
Sep. 14, 2010 (JP) .................................. 2010-205942

(51) Int. Cl.
*G06F 17/27* (2006.01)
(52) U.S. Cl.
CPC .................................. *G06F 17/271* (2013.01); *G06F 17/2705* (2013.01)
USPC .................................................. 704/9; 704/1
(58) Field of Classification Search
CPC .............................. G06F 17/27; G06F 17/2705
USPC .......................................................... 704/9, 1
See application file for complete search history.

(56) References Cited

U.S. PATENT DOCUMENTS

| | | | |
|---|---|---|---|
| 5,251,292 A * | 10/1993 | Martel et al. .................. 715/236 |
| 5,386,570 A | 1/1995 | Lindhorst | |
| 6,321,190 B1 | 11/2001 | Bernardes et al. | |
| 6,434,523 B1 * | 8/2002 | Monaco ........................ 704/257 |
| 7,027,975 B1 * | 4/2006 | Pazandak et al. .................. 704/9 |
| 2002/0046018 A1 * | 4/2002 | Marcu et al. ....................... 704/9 |
| 2002/0095660 A1 * | 7/2002 | O'Brien et al. ............... 717/127 |
| 2003/0208743 A1 * | 11/2003 | Chong et al. ................... 717/106 |
| 2008/0140387 A1 * | 6/2008 | Linker .............................. 704/9 |
| 2010/0082587 A1 | 4/2010 | Hatori | |
| 2010/0191632 A1 * | 7/2010 | Hogan et al. .................... 705/35 |
| 2010/0250235 A1 * | 9/2010 | Madan .............................. 704/9 |
| 2011/0010163 A1 * | 1/2011 | Jansen .............................. 704/9 |
| 2011/0131156 A1 * | 6/2011 | Fisher et al. .................... 706/12 |

FOREIGN PATENT DOCUMENTS

| | | |
|---|---|---|
| JP | 63-138465 | 6/1988 |
| JP | 63-221475 | 9/1988 |
| JP | 07-141201 | 6/1995 |
| JP | 2000-339552 | 12/2000 |

(Continued)

OTHER PUBLICATIONS

Sagae et al (hereinafter Sagae) "Parser Combination by Reparsing", in Proceedings of the Human Language Technology Conference of the North American Chapter of the ACL, 2006.*
Valkering (thereafter Valkering) "Syntax Error Handling in Scannerless Generalized LR Parsers", Master's thesis, Universiteit, Van Amsterdam, Aug. 2007.*

(Continued)

*Primary Examiner* — Jialong He
(74) *Attorney, Agent, or Firm* — Jennifer R. Davis; Anne Vachon Dougherty

(57) ABSTRACT

A computer implemented method, a computer system, and a program for generating a parser combination. The method includes: generating a parser combination by combining parsers each associated with at least one grammar description, where the step is carried out using (i) at least one grammar description means and (ii) a computer device. The computer system includes: a processor, a memory connected to the processor, and a parser generator for generating a parser combination in the memory by combining parsers each associated with at least one grammar description, and at least one grammar description type means.

22 Claims, 21 Drawing Sheets

(56) References Cited

FOREIGN PATENT DOCUMENTS

| | | |
|---|---|---|
| JP | 2001-0067358 | 3/2001 |
| JP | 2004-046607 | 2/2004 |
| JP | 2004-126640 | 4/2004 |
| JP | 2006-107079 | 4/2006 |
| JP | 2010-079646 | 4/2010 |

OTHER PUBLICATIONS

Ierusalimschy "A text pattern-matching tool based on Parsing Expression Grammars", Published online Jul. 17, 2008 in Wiley InterScience (www.interscience.wiley.com), 2008.*

Sha et al (hereinafter Sha), "Shallow Parsing with Conditional Random Fields", Proceedings of HLT-NAACL 2003.*

* cited by examiner

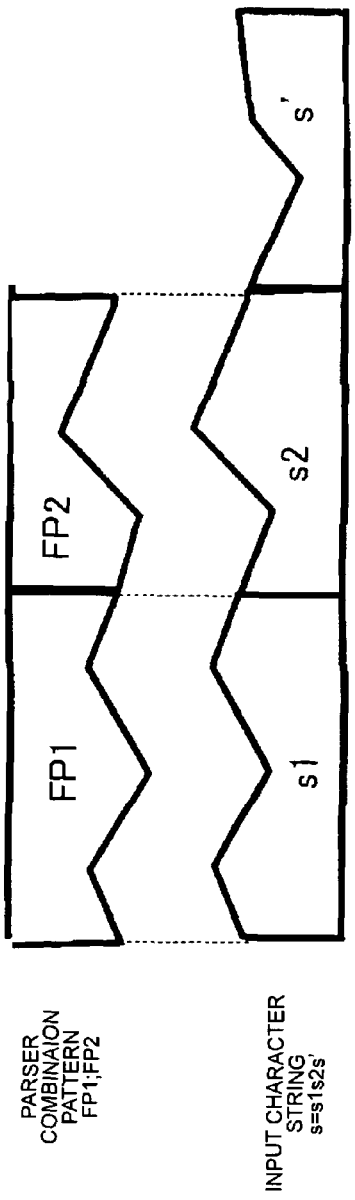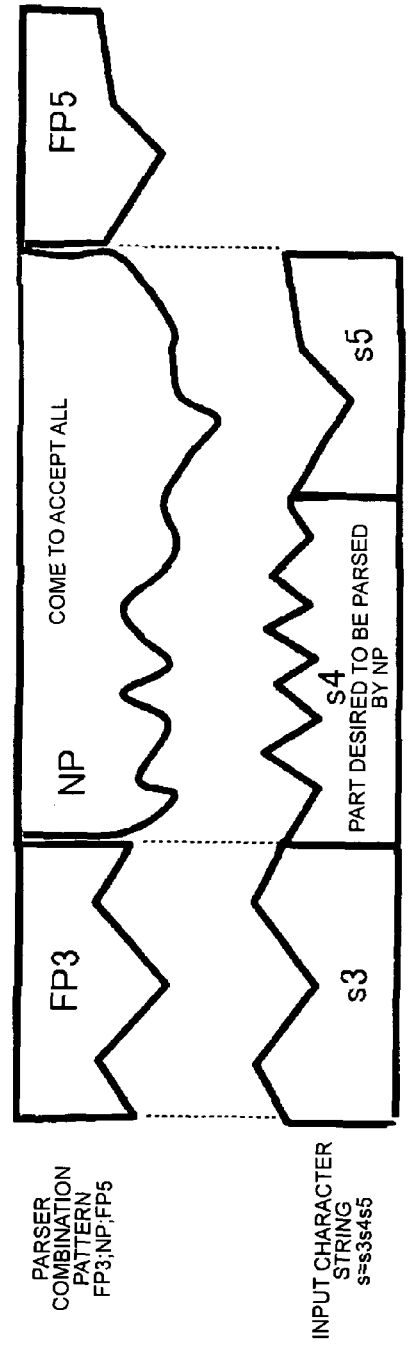
Figure 1(a) PRIOR ART
Figure 1(b) PRIOR ART

PRIOR ART

GRAMMAR G IS DEFINED BY (A, S, Σ, Z, R).
GRAMMAR G HAS SAME MEANING AS PEGS EXCEPT FOR PART OF DEFINITION OF P, AND Z

- A : SET OF NONTERMINAL SYMBOLS.  NONTERMINAL SYMBOL IS REPRESENTED BY X (X ∈ A)
- S : START SYMBOLS.  START SYMBOL IS SPECIAL NONTERMINAL SYMBOL S ∈ A
- Σ : SET OF CHARACTERS (SET OF TERMINAL SYMBOLS).  Σ* REPRESENTS CHARACTER STRING. CHARACTER STRING IS REPRESENTED BY s
- Z : SET OF NATURAL LANGUAGE PROCESSING ANALYSIS NAMES.  NATURAL PROCESSING ANALYSIS NAME IS REPRESENTED BY N (N ∈ Z)
- R : SET OF RULES X::=P
  WHERE P IS EXPRESSION DEFINED BY FOLLOWING BACKUS-NAUR FORM (BNF), AND NONE OF X::=P ARE LEFT-RECURSIVE RULES.  IN ADDITION, FOR ANY RULES X1::=P1 AND X2::=P2 IN R, X1≠X2.

```
P ::= s          ACCEPT s FROM FIRST INPUT CHARACTER STRING.  IF FIRST INPUT CHARACTER STRING IS NOT s,
                 PARSING ERROR
    | eoi        ACCEPT INPUT TERMINAL SYMBOL (eoi REPRESENTS TERMINAL SYMBOL OF INPUT CHARACTER STRING)
    | X          VARIABLE (PERFORM PARSING BY P' IN X::=P' INCLUDED IN R)
    | P1; P2     PERFORM PARSING BY P1, AND THEN PERFORM PARSING ON REMAINING INPUT BY P2
    | P1 / P2    PERFORM PARSING BY P1, AND IF PARSING FAILS, PERFORM PARSING BY P2
    | P*         PERFORM PARSING BY P REPEATEDLY FOR CERTAIN NUMBER OF TIMES GREEDILY
    | &(P1)P2    PERFORM POSITIVE LOOKAHEAD BY P1; IF LOOKAHEAD IS SUCCESSFUL, PERFORM PARSING BY P2,
                 WHILE, IF LOOKAHEAD FAILS, PERFORM NO PARSING
    | !(P1)P2    PERFORM NEGATIVE LOOKAHEAD BY P1; IF LOOKAHEAD IS SUCCESSFUL, PERFORM PARSING BY P2, WHILE, IF
                 LOOKAHEAD FAILS, PERFORM NO PARSING
```

Figure 5

- R : SET OF RULES X::=P
  WHERE P IS AN EXPRESSION DEFINED BY FOLLOWING BACKUS-NAUR FORM (BNF), AND NONE OF X::=P ARE LEFT-RECURSIVE RULE. IN ADDITION, FOR ANY RULES X1::=P1 AND X2::=P2 IN R, X1≠X2.

| P ::= | |
|---|---|
| s | ACCEPT s FROM FIRST INPUT CHARACTER STRING. IF FIRST INPUT CHARACTER STRING IS NOT s, PARSING ERROR |
| \| eoi | ACCEPT INPUT TERMINAL SYMBOL (eoi REPRESENTS TERMINAL SYMBOL OF INPUT CHARACTER STRING) |
| \| X | VARIABLE (PERFORM PARSING BY P' IN X::=P' INCLUDED IN R) |
| \| P1; P2 | PERFORM PARSING BY P1, AND THEN PERFORM PARSING ON REMAINING INPUT BY P2 |
| \| P1 / P2 | PERFORM PARSING BY P1, AND IF PARSING FAILS, PERFORM PARSING BY P2 |
| \| P* | PERFORM PARSING BY P REPEATEDLY FOR CERTAIN NUMBER OF TIMES GREEDILY |
| \| &(P1)P2 | PERFORM POSITIVE LOOKAHEAD BY P1; IF LOOKAHEAD IS SUCCESSFUL, PERFORM PARSING BY P2, WHILE, IF LOOKAHEAD FAILS, PERFORM NO PARSING |
| \| !(P1)P2 | PERFORM NEGATIVE LOOKAHEAD BY P1; IF LOOKAHEAD IS SUCCESSFUL, PERFORM PARSING BY P2, WHILE, IF LOOKAHEAD FAILS, PERFORM NO PARSING |
| \| N | PERFORM PARSING BY NATURAL LANGUAGE PROCESSING PARSER N (FUNCTION ASSIGNED TO NATURAL LANGUAGE PROCESSING NAME N) |
| \| P1 U P2 | PARSE, BY P1, CHARACTER STRING FROM FIRST CHARACTER STRING TO INPUT CHARACTER STRING IMMEDIATELY BEFORE INPUT CHARACTER STRING FIRST ACCEPTABLE BY P2, AND THEN PARSE REMAINING INPUT CHARACTER STRING BY P2 IF NO CHARACTER STRING PART ACCEPTABLE BY P2 IS INCLUDED IN INPUT CHARACTER STRING, PARSING ERROR |
| \| P1 F P2 | PARSE CHARACTER STRING PART ACCEPTABLE BY P2 FROM FIRST INPUT CHARACTER STRING, AND THEN PARSE, BY P1, CHARACTER STRING PART ACCEPTED BY P2 IF NO CHARACTER STRING ACCEPTABLE BY P2 FROM FIRST INPUT CHARACTER STRING IS INCLUDED IN INPUT CHARACTER STRING, PARSING ERROR |

S = <Result And-Conditions>, ∑ = ALL CHARACTERS, A={P1,P2,P3,P4,P5,P6,P7,P8,P12,P13,Pn}, Z = {|is-a-nlp|}
R IS SET OF FOLLOWING RULES S  :: = P1 ; P2
P1 :: = (P12 / P13)
P2 :: = P3 ; P4
P3 :: = " "
P4 :: = P5 ; P6
P5 :: = (Pn U P8)
P6 :: = P7+                        //P7+ IS SHORT FORM FOR P7;P7*
P7 :: = (Pn U P8)
P12 :: =         "IF ALL SUBSEQUENT CONDITIONS ARE MET"
P13 :: =         IF ALL FOLLOWING CONDITIONS ARE MET
Pn :: = |is-a-NLP|
P8 :: = <LINE FEED>

Figure 14

| SYMBOL | FORM | EXAMPLE |
|---|---|---|
| B ::= | R, in the case (of) C | |
| \| | R for the case (of) C | |
| \| | R in the case (of) C | |
| \| | R only in the case (of) C | |
| \| | R at the time (of) C | |
| \| | R for the time (of) C | |
| \| | R, at the time (of) C | |
| \| | R only at the time (of) C | |
| \| | R, not in the case of C | |
| \| | R not in the case of C | |
| \| | R not for the case of C | |
| \| | R only not in the case of C | |
| \| | R, in a case other than C | |
| \| | R in a case other than C | |
| \| | R for a case other than C | |
| \| | R only in a case other than C | |
| | B1 | |
| | B2 | |
| \| | ... | |
| | Bn | |
| | R, in a case other than the above | |
| | B1 | |
| | B2 | |
| \| | ... | |
| | Bn | |
| | R, in a case other than these | |

Figure 19

GENERATING PARSER COMBINATION BY COMBINING LANGUAGE PROCESSING PARSERS

CROSS-REFERENCE TO RELATED APPLICATION

This application claims priority under 35 U.S.C. §119 from Japanese Patent Application No. 2010-205942 filed on Sep. 14, 2010, the entire contents of which are incorporated herein by reference.

BACKGROUND OF THE INVENTION

1. Field of the Invention

The present invention relates to a language processing field, and more particularly, a method, a computer system and a computer program for generating a parser combination (also called a hybrid parser) by combining at least two language processing parsers.

2. Related Art

In language processing, a syntax analyzer (parser) is used for analyzing the grammatical structure of a language. There are two main types of parsers, a natural language processing parser (also referred to as an np parser (an NLP parser), below) and a formal language processing parser (also referred to as an fp parser (a parser for formal grammar), below).

The natural language processing parser is a parser for interpreting natural sentences. Natural sentences are also called natural language text. Natural language text is a symbol system which has been developed naturally with cultural backgrounds and is used for everyday communication by humans.

The formal language processing parser, on the other hand, is a parser which is suitable for interpreting text including formal sentences. A formal sentence is a term used in contrast to a natural sentence or natural language text. Formal sentences are artificially defined sentences, such as a project deliverable document, a software specification, a document including a formula or a programming language, or the like. Examples of a project deliverable document include a requirements specification, a design specification and a technical specification.

A technique has been known which automatically generates a parser combination from declarative description data (also simply referred to as a declarative description, below) by combining language processing parsers. This technique is represented by a parser generator and a parser combinatory library, for example. Examples of a parser generator include Yacc (Yet Another Compiler-Compiler), ANTLR (Another Tool for Language Recognition), CPUS and Java (registered trademark) CC (Java (registered trademark) Compiler Compiler).

Examples of a parser combinatory library include Parsec (parallax of one arcsecond), JParsec and Scala standard library. These days, with the wide spread of tools such as Yacc, it has become possible to automatically generate a parser, in other words, to output source code of a program of a parser, simply by writing grammar.

In addition, an approach has been known in which a combination of patterns that cannot be declaratively described, e.g., a combination of a formal language processing parser and a parser for a different type processing (natural language processing, for example), is newly programmed every time when needed. This is because combining a natural language processing parser and a formal language processing parser is impossible by the conventional methods since the natural language processing parser and the formal language processing parser are different in characteristics.

Japanese Patent Application Publication No. Sho 63-138465 describes the following technique. In this technique, an inputted Japanese sentence is analyzed morphologically, a judgment is made on whether there is only one syntactic rule applicable to a part of a result of the morphological analysis, the syntactic rule is applied to the morphological analysis result in accordance with an output deriving from the judgment, and a morpheme string obtained as a result of the application is analyzed syntactically (Means for Solving the Problems).

SUMMARY OF THE INVENTION

One aspect of the invention is a computer-implemented method for generating a parser combination by combining at least two language processing parsers. The method includes the step of: generating a parser combination by combining parsers each associated with at least one grammar description, where the step is carried out using (i) at least one grammar description means and (ii) a computer device.

Another aspect of the invention is a computer system for generating a parser combination by combining at least two language processing parsers, the computer system comprising: a processor, a memory connected to the processor, and a parser generator for generating a parser combination in the memory by combining parsers each associated with at least one grammar description, where the generator uses at least one grammar description means to carry out the generating.

BRIEF DESCRIPTION OF THE DRAWINGS

FIG. 1(a) illustrates an example of a parser combination according to a conventional technique.

FIG. 1(b) illustrates an example of a parser combination according to a conventional technique.

FIG. 5 illustrates examples of existing grammar descriptions which can be used by a formal language processing parser generator shown in FIG. 3.

FIG. 6 illustrates examples of grammar descriptions which are newly added, in an embodiment of the present invention, to the existing grammar descriptions shown in FIG. 5.

FIG. 14 illustrates examples of grammar descriptions which are created by a user for the examples of grammar descriptions shown in FIG. 13.

FIG. 19 illustrates a table for explaining a case of parsing a specific description part of a specific design specification in a project, according to an embodiment of the present invention.

DETAILED DESCRIPTION OF THE PREFERRED EMBODIMENTS

Figure 2:
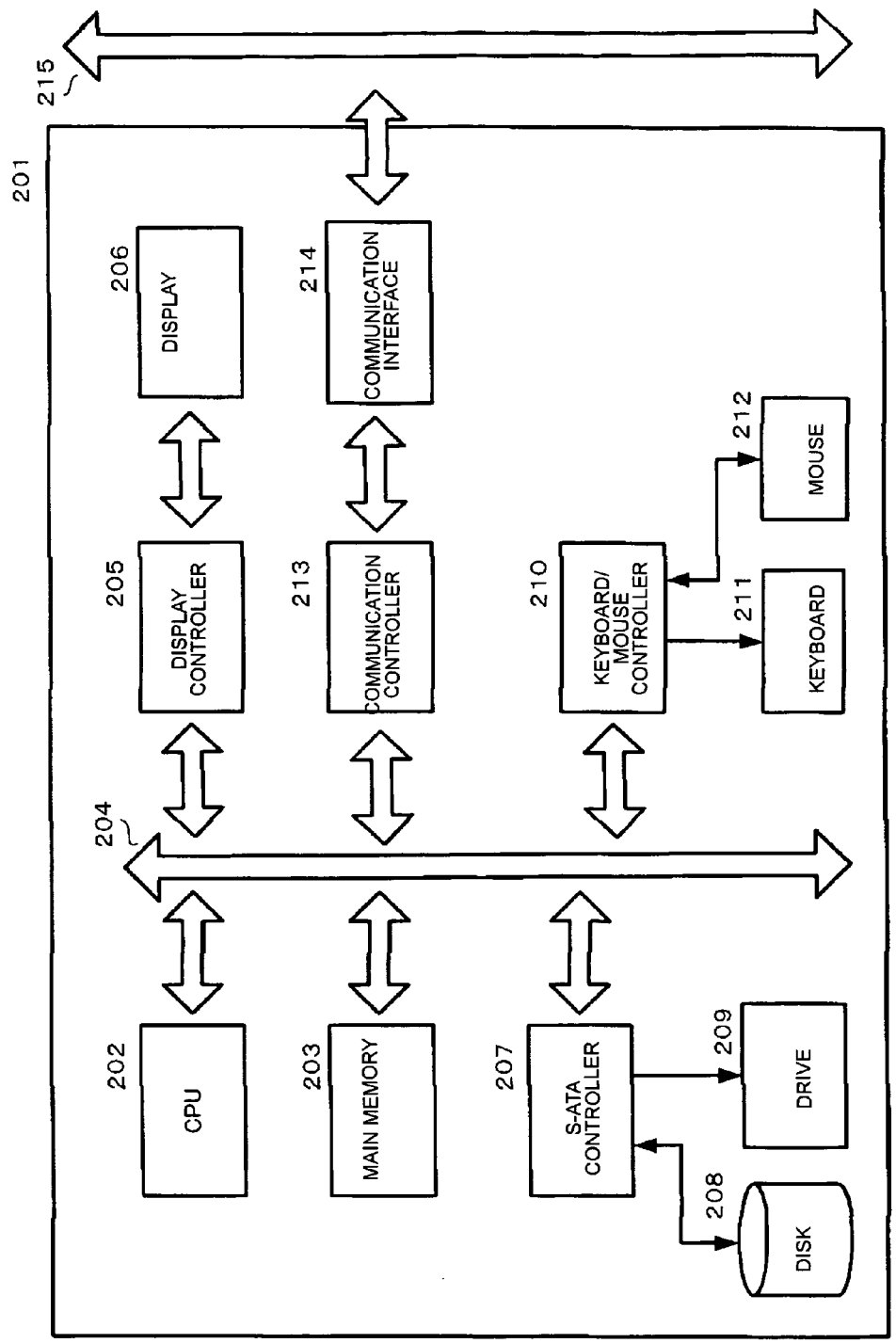
FIG. 2 illustrates a basic block diagram of computer hardware which can be used in an embodiment of the present invention.

A parser combination of formal language processing parsers and a parser combination of a formal language processing parser and a natural language processing parser, i.e., a different type processing parser, are based on the assumption that each of the parsers to be combined has an accept language. For this reason, it is not possible to describe many of the applications of various kinds of natural language processing by only using existing grammars, e.g., PEGs (Parsing Expression Grammars). FIGS. 1A and 1B show examples of this problem.

FIG. 1A shows an example of automatically generating a parser combination from a declarative description by combining formal language processing parsers. The parser combination pattern (FP1;FP2) in FIG. 1A is the combination of formal language processing parsers FP1 and FP2.

In the example in FIG. 1A, an input character string is s, specifically, s=s1s2s'. The processing for the parser combination in FIG. 1A is as follows: (1) FP1;FP2 receive the input character string s; and (2) FP1;FP2 accept s1 and s2, respectively, and then return the remaining character string s'.

In the combination pattern in FIG. 1A, a parser combination is automatically generated from a declarative description by combining the formal language processing parsers. This can be carried out at low cost. However, the combination pattern in FIG. 1A is based on the assumption that each of the parsers to be combined has an accept language, as shown by the fact that FP1;FP2 accept s1 and s2, respectively. Accordingly, the combination pattern in FIG. 1A using existing grammar descriptions cannot declare natural language processing.

FIG. 1B shows an example of automatically generating a parser combination from a declarative description by combining a formal language processing parser and a natural language processing parser for dealing with a different type processing. The parser combination pattern (FP3;NP;FP5) in FIG. 1B is the combination of a formal language processing parser FP3, a natural language processing parser NP and a formal language processing parser FP5.

In the example in FIG. 1B, an input character string is s, specifically, s=s3s4s5. The processing performed by the parser combination in FIG. 1B is as follows: (1) FP3;NP receive the input character string s; and (2) FP3 accepts s3, and NP accepts all the remaining character string (s4 and s5).

In the parser combination in FIG. 1B, NP accepts s4 and s5 all together since NP does not have any accept language. As a result, FP5 cannot accept s5, and hence FP5 is not applied to s5. Moreover, no existing standard grammar description can describe a combination pattern for applying FP5 to s5.

Meanwhile, a program created in a method for programming a declaratively-describable pattern combination independently every time when needed is generally complicated. For this reason, procedure for re-using or changing the program is difficult. Accordingly, maintenance of the program is costly, and moreover the program lacks general versatility.

Further, a project deliverable document, for example, has the characteristics of being described by a form including both formal parts (e.g., a specific form and a template) and natural sentences. For this reason, in extracting information from a project deliverable document, necessary information cannot be extracted only by using a formal language processing parser (fp).

Moreover, a project deliverable document is characterized in that the type and format thereof, for example, depend on the project, and that the type or format is frequently changed. Accordingly, a cost of generating a parser combination is required for each project deliverable document. In addition, since a parser combination is generated for each project deliverable document, parser combinations thus generated lack general versatility.

To address the above-described problems, and also from the viewpoints of cost and versatility, a technique for automatically generating a parser combination in such a manner that a character string processing function (N), e.g., a natural language processing parser (NP), can be combined, without any change, with a formal language processing parser (fp) already existing in a library, has been desired instead of a technique for programming a parser combination individually for each program.

It is an object of the present invention to provide a method, a computer system and a computer program for automatically generating a parser combination by combining at least two language processing parsers.

The present invention combines parsers each associated with at least one of grammar descriptions defined as follows, in automatically generating a parser combination:

(1) a grammar description P1 U P2 means to parse input character strings in such a manner that the first input character string to an input character string immediately before at least one input character string which is first acceptable by a second parser associated with a second grammar description (P2) is parsed by use of a first parser associated with a first grammar description (P1), and that the at least one input character string first acceptable by the second parser is parsed by use of the second parser; and (2) a grammar description P1 F P2 means to parse input character strings in such a manner that a prefix string of the input character strings and being acceptable by the second parser associated with the second grammar description (P2) is parsed by use of the second parser, and that the prefix string already parsed is parsed by use of the first parser associated with the first grammar description (P1).

Moreover, in an aspect of the present invention, the present invention provides a method, a computer system and a computer program for automatically generating a parser combination by combining, with a formal language processing parser (fp), a character string processing function (N) other than fp, e.g., any of various natural language processing functions (NP).

Moreover, in an aspect of the present invention, the present invention provides a method, a computer system and a computer program for automatically generating a parser combination by combining a formal language processing parser (fp) and a character string processing function (N) from a declarative description including multiple grammar descriptions.

Moreover, in an aspect of the present invention, the present invention provides a method, computer system and a computer program for extending existing grammar descriptions, e.g., PEGs, so as to make it possible to analyze an input character string part which cannot be analyzed by using the existing grammar descriptions.

Moreover, in an aspect of the present invention, the present invention provides a method, a computer system and a computer program for extracting information from data from which information is to be extracted, by using a parser combination including parsers each associated with an extended grammar description.

Moreover, in an aspect of the present invention, the present invention provides a method, a computer system and a computer program for checking whether data are described according to a specific form, by using a parser combination including parsers each associated with an extended grammar description.

By adding, to the existing grammars, the grammar description P1 U P2 and/or the grammar description P1 F P2 according to the aspects of the present invention, parsers capable of explicitly dealing with a part which cannot be analyzed by using any existing standard grammars can be automatically generated. In addition, the grammar description P1 U P2 and/or the grammar description P1 F P2 according to the aspects of the present invention increases languages which can be accepted by parsers.

Further, a parser combination according to the aspects of the present invention can be applied to a specific part of an input character string without customizing parsers themselves included in the combination. In the following, representative embodiments of the present invention will be described, and correspondences between the embodiment and drawings to be described later are described by using parentheses. Then, the embodiments of the present invention will be further described on the basis of the drawings.

It should be understood that the embodiment of the present invention is for describing a preferable mode of the present invention, and that the scope of the invention is not intended to be limited to that described in the embodiment.

The present invention provides a method, a computer system and a computer program for generating a parser combination by combining at least two language processing parsers.

An embodiment of the method for the present invention includes a step of generating a parser combination in a memory by combining parsers each associated with at least one of grammar descriptions P1 U P2 and P1 F P2 defined as follows.

An embodiment of the computer system of the present invention includes: a processor; a memory connected to the processor; and a parser generator for generating a parser combination in the memory by combining parsers each associated with at least one of the grammar descriptions defined as follows.

The grammar descriptions are as follows:

a grammar description P1 U P2 (FIG. 6) means to parse input character strings in such a manner that the first input character string to an input character string immediately before at least one input character string which is first acceptable by a second parser associated with a second grammar description (P2) are parsed by use of a first parser associated with a first grammar description (P1), and that the at least one input character string first acceptable by the second parser is parsed by use of the second parser; and a grammar description P1 F P2 (FIG. 6) means to parse input character strings in such a manner that a prefix of the input character strings and being acceptable by the second parser associated with the second grammar description (P2) is parsed by use of the second parser, and that the prefix string already parsed is parsed by use of the first parser associated with the first grammar description (P1).

In an embodiment of the present invention, the method for generating a parser combination can be implemented by executing a step of: carrying out programming for operation corresponding to each of the above grammar descriptions by using a general programming language, e.g., C language, C++ language or Java (registered trademark) language, instead of using any declarative description; and then generating a parser combination by combining the parsers.

In another embodiment of the present invention, the method for generating a parser combination further includes the steps of: receiving, at a memory, a declarative description including multiple grammar descriptions; and identifying each combination of the grammar descriptions shown in the received declarative description by parsing the declarative description. Here, the grammar descriptions shown in the declarative description include at least one selected from the grammar description P1 U P2 and the grammar description P1 F P2.

In another embodiment of the present invention, the method for generating a parser combination includes: a step of receiving a declarative description including multiple grammar descriptions; a step of identifying each combination of the grammar descriptions shown in the received declarative description by parsing the received declarative description; and a step of generating a parser combination by parsing the parsers each associated with any of the identified grammar descriptions.

The grammar descriptions shown in the declarative description include at least one selected from the grammar description P1 U P2 and the grammar description P1 F P2.

In an embodiment of the present invention, the declarative description includes multiple grammar descriptions. In the aspect of the present invention, a parser combination is generated by combining parsers each associated with any of the multiple grammar descriptions in the declarative description. The declarative description can include combination patterns of grammar descriptions described by combining grammar descriptions described on the basis of a series of rules, for example. The declarative description can be described by a user or automatically generated by a computer, by following a certain grammar. The grammar can include grammar descriptions following PEGs, for example (see FIG. 5 and FIG. 6).

In an embodiment of the present invention, the grammar descriptions are characterized by including at least one selected from the following according to the embodiment of the present invention (newly added grammar descriptions in FIG. 6).

In the embodiment of the present invention, the grammar can include existing grammar descriptions, e.g., PEGs (FIG. 5), in addition to the grammar description P1 U P2 and/or the grammar description P1 F P2.

In an embodiment of the present invention, the grammar descriptions included in the declarative description can include:

(1) a grammar description which is a name of a character string processing parser not having any accept language while accepting and parsing all input character strings (this grammar description will be referred to as N, below); and (2) at least one selected from the grammar description P1 U P2 and the grammar description P1 F P2.

Figure 13:
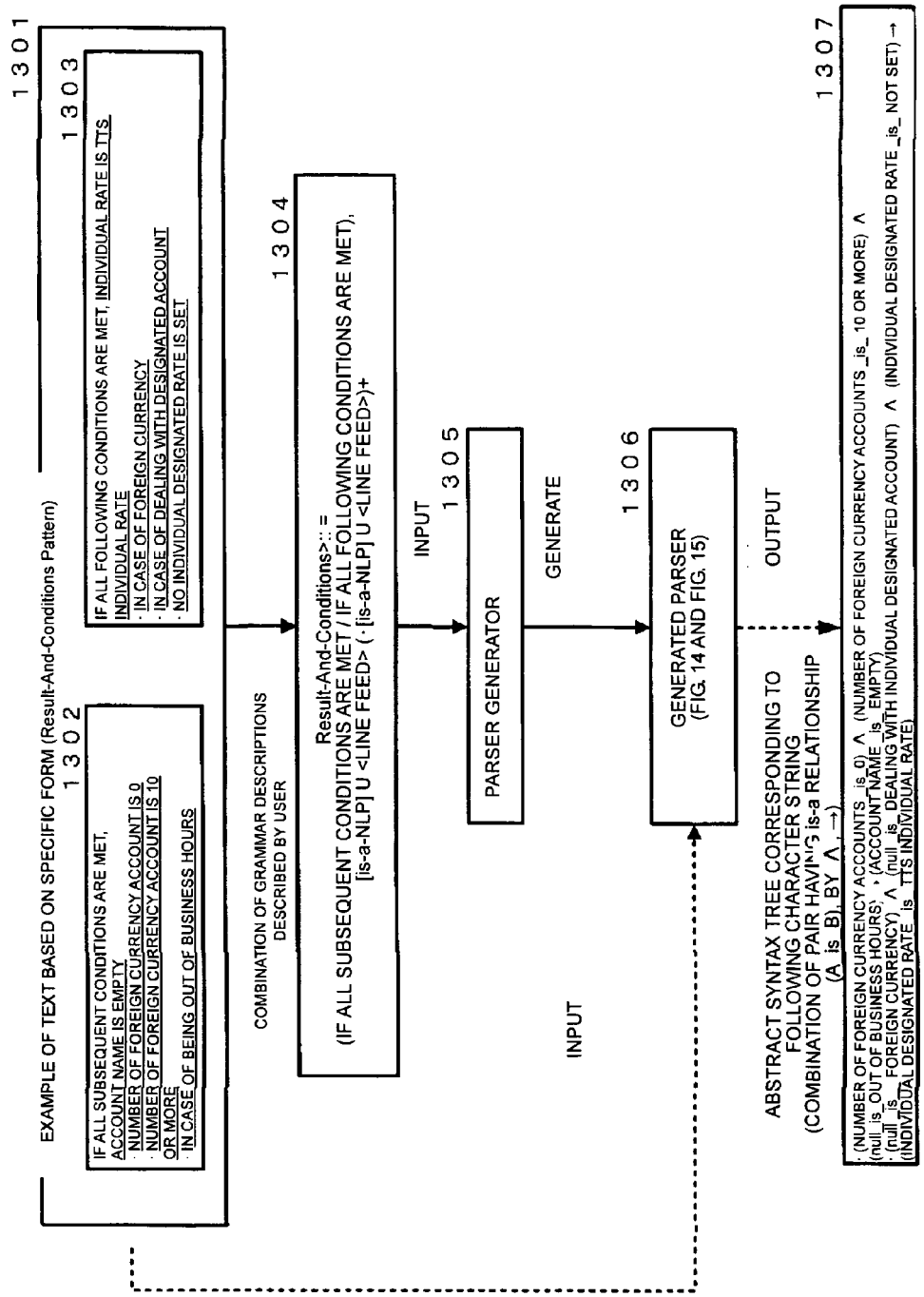
FIG. 13 illustrates an example of extracting information from an input text by using a parser combination generated according to an embodiment of the present invention illustrated in FIG. 8.

In an embodiment of the present invention, the grammar description of one of P1 and P2 in the grammar description P1 U P2 can be the grammar description N (see "[is-a-NLP]" in 1304 in FIG. 13).

Similarly, in the embodiment of the present invention, the grammar description of one of P1 and P2 in the grammar description P1 F P2 can be the grammar description N.

The grammar description N is a character string processing function not having any accept language while accepting and parsing all input character strings. The character string processing function can be a natural language processing parser. Moreover, a parser corresponding to the natural language processing parser can be registered to a natural language processing registration store.

Further, in an embodiment of the present invention, the grammar description of at least the other of P1 and P2 in the grammar description P1 U P2 can describe a formal language processing parser. Similarly, in an embodiment of the present invention, the grammar description of at least the other of P1 and P2 in the grammar description P1 F P2 can describe a formal language processing parser.

In an embodiment of the present invention, in the grammar description P1 F P2, at least one input character string including the first input character string and being first acceptable by the second parser can be the longest character string from the first character string. Here, the longest character string means a character string having a strength of a parser p1 corresponding to the grammar description P1. The parser p1 accepts the longest one of the character strings when there exist multiple acceptable character strings including the first character string.

Accepting the longest character string means that, if the parser p1 is, for example, a parser a*, the parser a* can accept any of the character strings a, aa and aaa. Here, when parsing a character string aaab, the parser a* always accepts a character string aaa, and returns the remaining character string b as a parsing result. This is to always obtain a unique parsing result.

In an embodiment of the present invention, the identifying step can include to identify a top-level combination of the grammar descriptions in the declarative description. Moreover, in an embodiment of the present invention, the identifying step can further include, after identifying the top-level combination, the step of parsing at least one of the identified combination and thereby further identifying a combination of the grammar descriptions in the parsed combination.

In an embodiment of the present invention, the formal language processing parser (fp) is a parser having an accept language. In order that the formal language processing parser (fp) is capable of accepting or not accepting an input character string, an accept language needs to be determined in advance. The formal language processing parser (fp) is formulated as a function which receives an input character string and then returns, for example, an abstract syntax tree, or an abstract syntax tree and the remaining character string not being parsed, as a parsing result.

The natural language processing (N), which is a character string processing other than FP, is associated with a grammar description N. The natural language processing (N) is a character string processing function having no accept language while accepting all input characters. The natural language processing (N) represents any various black-boxed natural language processing functions.

The characteristics of the natural language processing (N) are that the natural language processing (N): does not have any accept language, different from the formal language processing parser (fp); and can freely perform, on an input character string, statistical processing, dictionary-search processing and the like based on natural language knowledge, in the natural language processing function, since the natural language processing (N) does not need to have any formally-defined accept language. Accordingly, various kinds of practical natural language processing can be represented by N.

As the natural language processing (N), any of various natural language processing functions (NP) can be specified, for example. The natural language processing (N) is formulated as a function which receives an input character string and then returns, for example, an abstract syntax tree as a parsing result.

Figure 3:
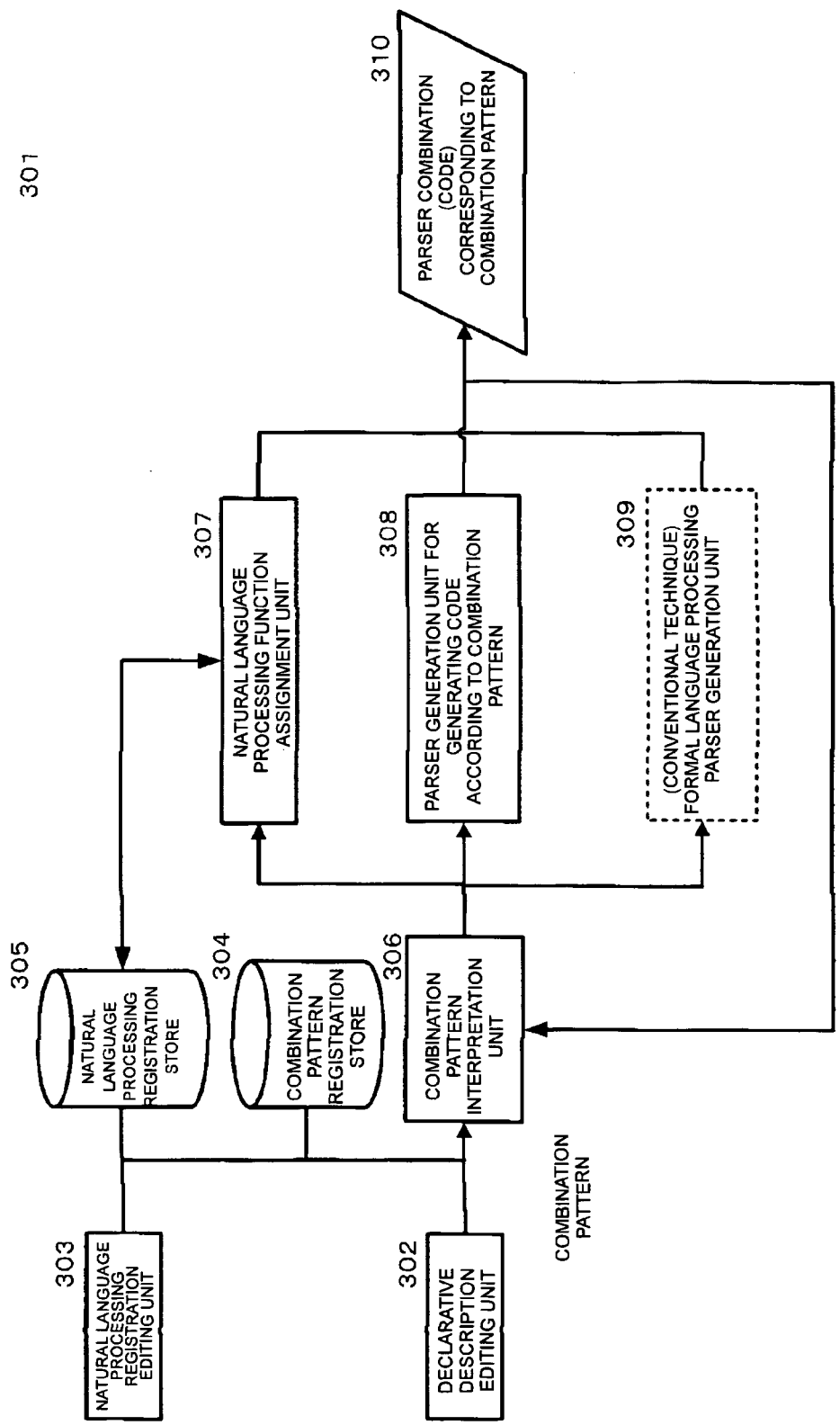
FIG. 3 illustrates a functional block diagram of a parser generator which is the embodiment of the present invention, in the computer hardware shown in FIG. 2, and which automatically generates a parser combination by combining language processing parsers.

In an embodiment of the present invention, the natural language processing (N) is described as is-a-NLP, for example, and is-a-NLP is a natural language processing function which extracts a pair having an is-a relationship while considering the entire input character string as a sentence, and then returns a syntax tree as a result of the extraction (see 1304 in FIG. 3).

Moreover, the present invention provides a method for using a parser combination.

(1) An embodiment of the method includes the steps of: receiving, at a memory, data from which information is to be extracted; finding, from the data, a character string part acceptable by the second parser associated with the second grammar description (P2), by use of the second parser; parsing character string parts in such a manner that the first character string of the data to a character string part immediately before the first character string part of the found string parts, by use of the first parser associated with the first grammar description (P1); parsing the found character string by use of the second parser; and creating, in the memory, a syntax tree on the basis of a first analysis result obtained by the parsing by the first parser and a second analysis result obtained by the parsing by the second parser.

(2) Another embodiment of the method includes the steps of: receiving, at a memory, data to be checked; finding, from the data, at least one character string part including the first character string of the data and being acceptable by the second parser associated with the second grammar description (P2), by use of the second parser; parsing the found character string part by use of the first parser associated with the first grammar description (P1); and creating, in the memory, a syntax tree on the basis of a first analysis result obtained by the parsing by the first parser.

Examples of data from which information is to be extracted or which are to be checked (also simply referred to as target data, below) are a project deliverable document, a software specification and a document including a formula or a programming language, but the data are not limited to these.

In target data, important information can sometimes be written by natural sentences adopting a specific form. In addition, in target data, the entire structure can be assumed to have regularity which can be dealt with by an existing formal language parser, in many cases, while individual descriptions in the data often have a high degree of flexibility.

In an embodiment of the present invention, a parser combination according to the embodiment of the present invention can be used to extract information from document data from which information is to be extracted, e.g., project deliverable document data, or document data including a formula or a programming language.

Moreover, in an embodiment of the present invention, a parser combination according to the embodiment of the present invention can be used to mechanically check data. The mechanical check can be used, for example, to check the format or the contents of data to be checked, e.g., project deliverable document data or document data including a formula or a programming language.

In the following, an embodiment of the present invention will be further described with reference to the drawings. Unless otherwise stated, the same reference numerals indicate the same objects throughout the drawings.

Figure 12:
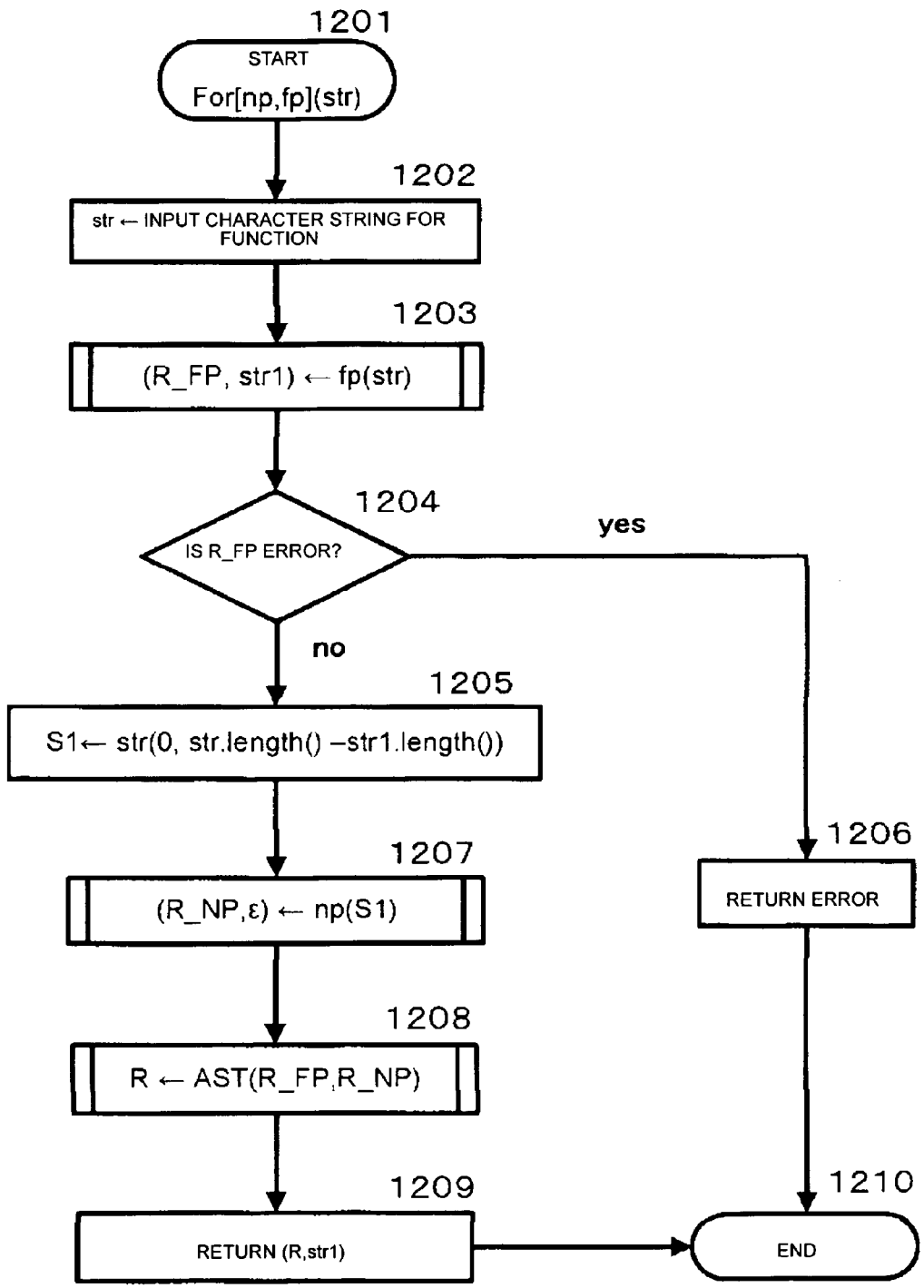
FIG. 12 illustrates a flowchart showing parsing operation of a function For[np,fp] in the case where P=P1 F P2 shown in FIG. 10 is P=NP F FP.

FIG. 12 shows a basic block diagram of computer hardware which can be used in the embodiment of the present invention.

A computer (201) includes a CPU (202) and a main memory (203) which are connected to a bus (204). The CPU (202) is preferably based on a 32-bit or 64-bit architecture, and a CPU of Core i1® series, Core 2® series, Atom® series, Xeon® series, Pentium® series or Celeron® series from Intel corporation, or Phenom® series, Athlon® series, Turion® series or Sempron® from Advance Micro Devices Inc. can be used as the CPU (202).

A display (206), e.g., a liquid crystal display (LCD) can be connected to the bus (204) through a display controller (205).

The display (206) is used to display information on computers connected to the network through communication lines and information on software operating on the computers, by using an appropriate graphic interface, for the purpose of computer management. In addition, a disk (208), e.g., a hard disk or a silicon disk, and a drive (209), e.g., a CD, DVD or BD drive, can be connected to the bus (204) through a SATA or IDE controller (207). Further, a keyboard (211) and a mouse (212) can be connected to the bus (204) through a keyboard/mouse controller (210) or a USB bus (not illustrated).

An operating system, a program for providing a Java (registered trademark) processing environment such as J2EE, a Java (registered trademark) application and a Java (registered trademark) virtual machine (VM), other programs and data can be stored in the disk (208) so as to be loadable to the main memory.

The drive (209) is used to install a program from a CD-ROM, a DVD-ROM or a BD to the disk (208) when needed.

A communication interface (214) is based on an Ethernet (registered trademark) protocol, for example. The communication interface (214) is connected to the bus (204) through a communication controller (213) and thereby plays a role of physically connecting the computer (201) to a communication line (215), and hence provides a network interface layer to a TCP/IP communication protocol of a communication function of the operating system of the computer (201). Here, the communication line can be a wired LAN environment or a wireless LAN environment based on a wireless LAN connection standard, e.g., IEEE 802.11a/b/g/n.

FIG. 3 shows a functional block diagram of a parser generator (301), of the computer (201) shown in FIG. 2, which is the embodiment of the present invention and automatically generates a parser combination (310) by combining language processing parsers.

The parser generator (301) includes a declarative description editing unit (302) (also simply referred to as a first editing unit (302), below), a natural language processing registration editing unit (303) (also simply referred to as a second editing unit (303), below), a combination pattern registration store (304), a natural language processing registration store (305), a combination pattern interpretation unit (306) (also simply referred to as an interpretation unit (306), below), a natural language processing function assignment unit (307) (also referred to as an assignment unit (307), below), a parser generation unit (308) (also referred to as a first parser generation unit, below), and a formal language processing parser generation unit (309) (also referred to as a second parser generation unit, below).

Here, the parser generator (301) can be composed of one or multiple computers. In addition, each of the registration stores (304 and 305) can be an external storage medium, e.g., a NAS, connected to the parser generator (301) through a wireless or wired network (not illustrated).

The first editing unit (302) includes a pattern description editor, and is an interface unit for allowing a user to edit a declarative description including a grammar description combination pattern by using the pattern description editor. A grammar description combination is also an expression representing parser operation. This grammar description combination is described by using grammar descriptions which are added and extended in the present invention as will be described later, on the basis of the characteristics and object of an input text which is a target for information extraction.

On the basis of the characteristics and object of the text which is the target of information extraction, the user creates a declarative description by using grammar descriptions described in FIG. 6, by use of the first editing unit (302).

The second editing unit (303) includes an editor, and is an interface unit for allowing the user, for example, to register natural language processing (N) (e.g., a natural language processing function (NP)) to the natural language processing registration store (305), and to delete natural language processing (N) from the natural language processing registration store (305), by using the editor. Here, the parser generator (301) can include an editing unit having the function of the first editing unit (302) and the function of the second editing unit (303) integrated therein. Additionally, the editor of the second editing unit (303) can be implemented by the first editing unit (302).

The combination pattern registration store (304) registers a grammar description combination pattern inputted in the first editor (302). This registration facilitates maintenance of grammar description combinations, and makes it possible to reuse grammar description combinations.

The natural language processing registration store (305) stores a correspondence relationship between a usable natural language parser (N), e.g., the name of a natural language processing function (NP), and the actual processing function of N.

The interpretation unit (306) receives a declarative description in the memory (203), and then interprets a combination pattern described in the declarative description. Thereafter, on the basis of the interpreted pattern, a code of the parser combination is generated by the assignment unit (307), the first parser generation unit (308) or the second parser generation unit (309), or a combination of these. Here, "combination" of a "parser combination" can mean that, if one parser cannot accept an input character string, the other parser receives and parses the input character string.

When a character string processing function, e.g., the name of natural language processing, is described in the declarative description, the assignment unit (307) extracts a processing function associated with the natural language processing name from the natural language processing registration store (305), and inserts the extracted processing function or the call code of the extracted processing function into the code of the parser combination (310).

When any of the extended grammar descriptions are described in the declarative description, the first parser generation unit (308) automatically generates a code for performing processing based on each of the extended grammar description in the memory (203), and inserts the generated code or the call code of the generated code into the parser combination (310).

When any of grammar descriptions of conventional techniques, e.g., PEG, are described in the declarative description, the second parser generation unit (309) automatically generates a code for performing the processing based on each of the PEGs, and inserts the generated code or a call code of the generated code into the parser combination (310).

The parser combination (310) created on the basis of the combination pattern is used to extract information from an input character string. Here, before the extraction, the parser combination (310) is converted into an executable code by a compiler.

Figure 4:
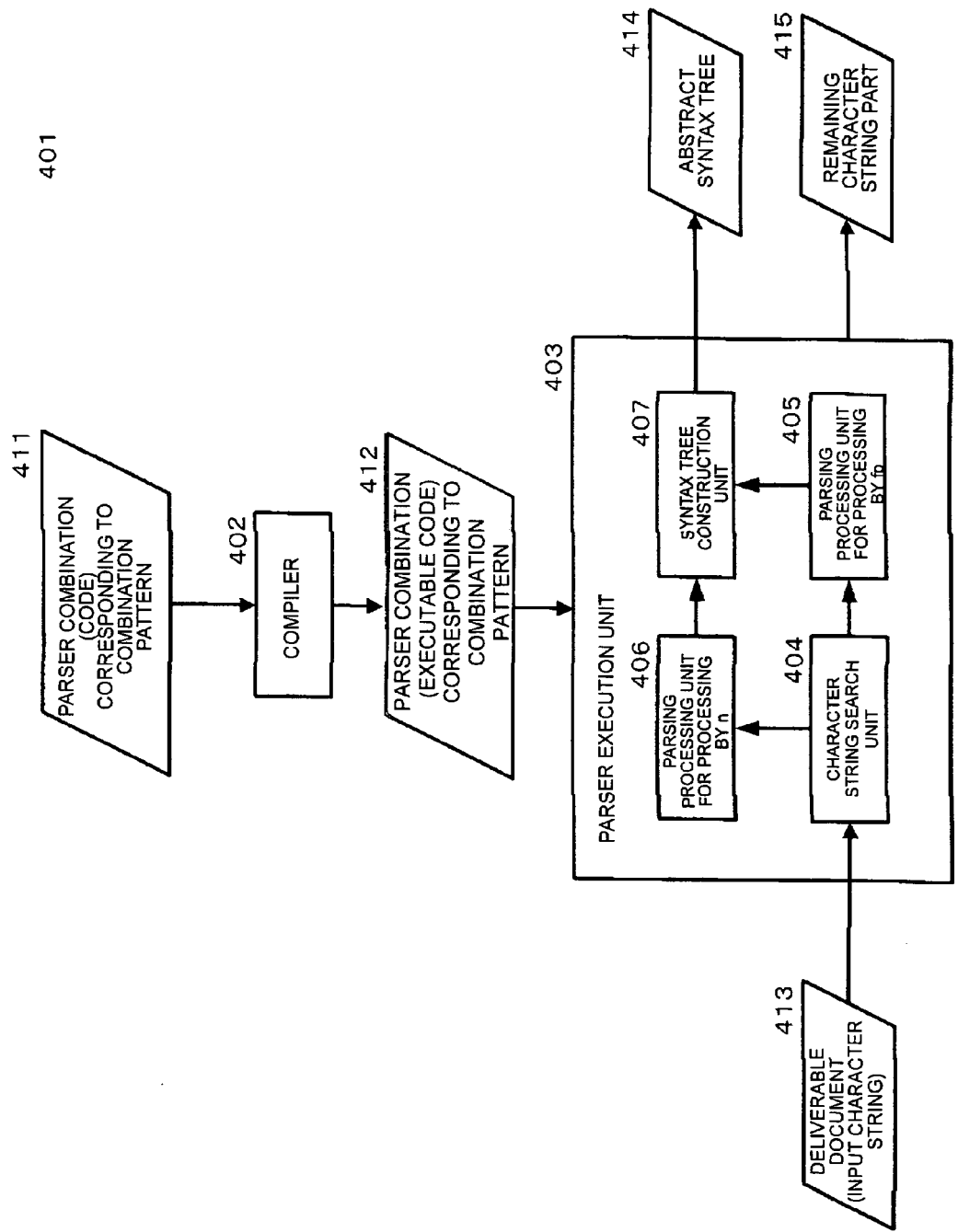
FIG. 4 illustrates shows a functional block diagram of an information extraction device which extracts or checks information from an input character string by using a parser combination generated by the parser generator shown in FIG. 3.

FIG. 4 shows a functional block diagram of an information extraction device (401) which extracts information from an input character string (413) or checks information by use of the parser combination (310) generated by the parser generator (301) shown in FIG. 3.

The information extraction device (401) includes a compiler (402) and a parser execution unit (403).

The compiler (402) compiles a parser combination (code) generated by the parser generator shown in FIG. 3, and thereby generates an executable code (executable code) (412).

The parser execution unit (403) parses a deliverable document (413) by using the executable code (412), and returns, for example, an abstract syntax tree (414) as a parsing result.

In the embodiment of the present invention, the parser execution unit (403) can include a character string search unit (404), an fp parsing processing unit (405), an n parsing processing unit (406) and a syntax tree construction unit (407).

In the following, operation of the parser execution unit (403) will be described by taking, as an example, a processing function For[np,fp] when P1 is NP and P2 is FP in P=P1 F P2 (P=NP F FP). Here, s(i,j) represents a character string corresponding to index k~(j−1) of an input character string s.

The character string search unit (404) receives the deliverable document (413), and finds the first character string part str(k,l) acceptable by FP.

The fp parsing processing unit (405) parses a character string str(k,..) by use of the parser fp.

The n parsing processing unit (406) parses a character string str(0,k−1) by use of the parser n.

The syntax tree construction unit (407) generates an abstract syntax tree AST 1 as a parsing result from the fp parsing processing unit (405), and also generates an abstract syntax tree AST2 as a parsing result from the n parsing processing unit (406). Further, the syntax tree construction unit (407) generates an abstract syntax tree AST (414) having F as its root and AST1 and AST2 as its child nodes.

Then, the parser execution unit (403) returns the abstract syntax tree AST (414) and a remaining character string part (415).

FIG. 5 shows examples of existing grammar descriptions which can be used by the formal language processing parser generation unit (309) shown in FIG. 3.

Although PEGs are taken as an example in the following, it should be noted that the present invention is not limited only to PEGs.

The grammar G is defined by $(A,S,\Sigma,Z,R)$. The grammar G has the same meaning as the PEGs except for part of the definition of P, and Z. The meaning of each of the definitions A, S, $\Sigma$, Z and R is as described in FIG. 5.

Each parser is generated on the basis of the grammar G as follows. Specifically, each parser is generated by recursively performing, on each rule $X::=P\in R$, processing according to the rule as defined in FIG. 5 in association with the form of P.

A code generated on the basis of P of the rule X::=P is considered as a parser associated with X. Here, only one rule having the form of X::= . . . is included in R due to a restriction of the PEGs.

In addition, a parser associated with s is a parser which performs parsing based on the grammar G.

In the case of the grammar description P=s, the second parser generation unit (309) checks whether an input character string includes a character string s as the first character string. If the input character string starts with the character string s, the second parser generation unit (309) accepts s, and then returns a syntax tree corresponding to the accepted part and a character string excluding the first character string s from the input character string.

For example, in the case of parsing an input character string abcdef by use of a parser ab, the parser ab accepts the first character string ab, creates a syntax tree corresponding to the accepted part, and then ab is excluded from the input character string. Then, the parser ab returns the syntax tree corresponding to ab and the remaining character string cdef as a parsing result. If the input character string does not start with the character string s, on the other hand, the second parser generation unit (309) generates a code for returning parsing error.

In the case of the grammar description P=eoi, the second parser generation unit (309) generates a code for returning parsing success if an input character string is empty while returning parsing error if the input character string is not empty.

In the case of the grammar description P=X, the second parser generation unit (309) generates a code for calling a code generated from P' of X::=P' included in R (the parser associated with X).

In the case of the grammar description P=P1;P2, the second parser generation unit (309) recursively creates parser parts p1 and p2 from P1 and P2, and generates a code for parsing an input character string by use of p1 first and then parsing the remaining input character string by use of p2.

In the case of grammar description P=P*, the second parser generation unit (309) recursively generates a parser part p from P, and generates a code for performing parsing repeatedly for the certain number of times greedily according to p.

In the case of the grammar description P=P*, the second parser generation unit (309) recursively generating a parser part p from P, and generates a code for performing parsing repeatedly for the certain number of times greedily according to p.

In the case of grammar description P=&(P1)P2, the second parser generation unit (309) recursively generates parse parts p1 and p2 from P1 and P2, and generates a code for performing positive look ahead on an input character string by use of the parser p1 (checking whether parsing by p1 is successful) and then parsing the same input character string by use of p2 if the positive look ahead is successful while performing nothing if the positive look ahead is unsuccessful.

In the case of the grammar description P=!(P1)P2, the second parser generation unit (309) recursively creates parser parts p1 and p2 from P1 and P2, and generates a code for performing negative look ahead on an input character string by use of the parser p1 (checking whether parsing by p1 is unsuccessful) and parsing the same input character string by use of p2 if the negative look ahead is successful while performing nothing if the negative look ahead is unsuccessful.

FIG. 6 shows examples of grammar descriptions newly added to the existing grammar descriptions shown in FIG. 5, in the embodiment of the present invention.

In FIG. 6, R of the grammar G is shown. This R shows three kinds of grammar descriptions newly introduced in the embodiment of the present invention.

The introduced three kinds of grammar descriptions are as follows.

The grammar description P=N: The grammar description N means to perform parsing based on character string processing (N) other than FP, e.g., natural language processing function (NP). Specifically, the character string processing (N) other than FP is performed by calling a processing function assigned to the natural language processing name N.

The grammar description P=P1 U P2: The grammar description P1 U P2 means P1 until P2. The grammar description P1 U P2 means to parse, with respect to an input character string, the first character string of the input character string to an input character string immediately before an input character string first acceptable by P2, by use of P1, and thereafter to parse the remaining input character string by use of P2. Meanwhile, if there is no character string acceptable by P2 in the input character string, parsing error is returned.

The grammar description P=P1 F P2: The grammar description P1 F P2 means P1 for P2. The grammar description P1 F P2 means to parse, with respect to an input character string, the first character string of the input character string to a character string part acceptable by P2, and thereafter to parse the character string part accepted by P2, by using P1. Meanwhile, if there is no character string acceptable by P2 in the first character string in the input character string, parsing error is returned.

On the basis of the grammar description newly added to the grammar G, each parser is generated as follows.

In the case of the grammar description P=N, the assignment unit (307) extracts a natural language processing function np (e.g., a natural language processing parser) associated with the name N from the natural language processing store, and generates a code for parsing an input character string by using np.

In the case of the grammar description P=P1 U P2, the first parser generation unit (308) recursively creates parser parts p1 and p2 from P1 and P2, and generates a code for performing operation based on a flowchart shown in FIG. 9 to be described below, for example.

Figure 10:
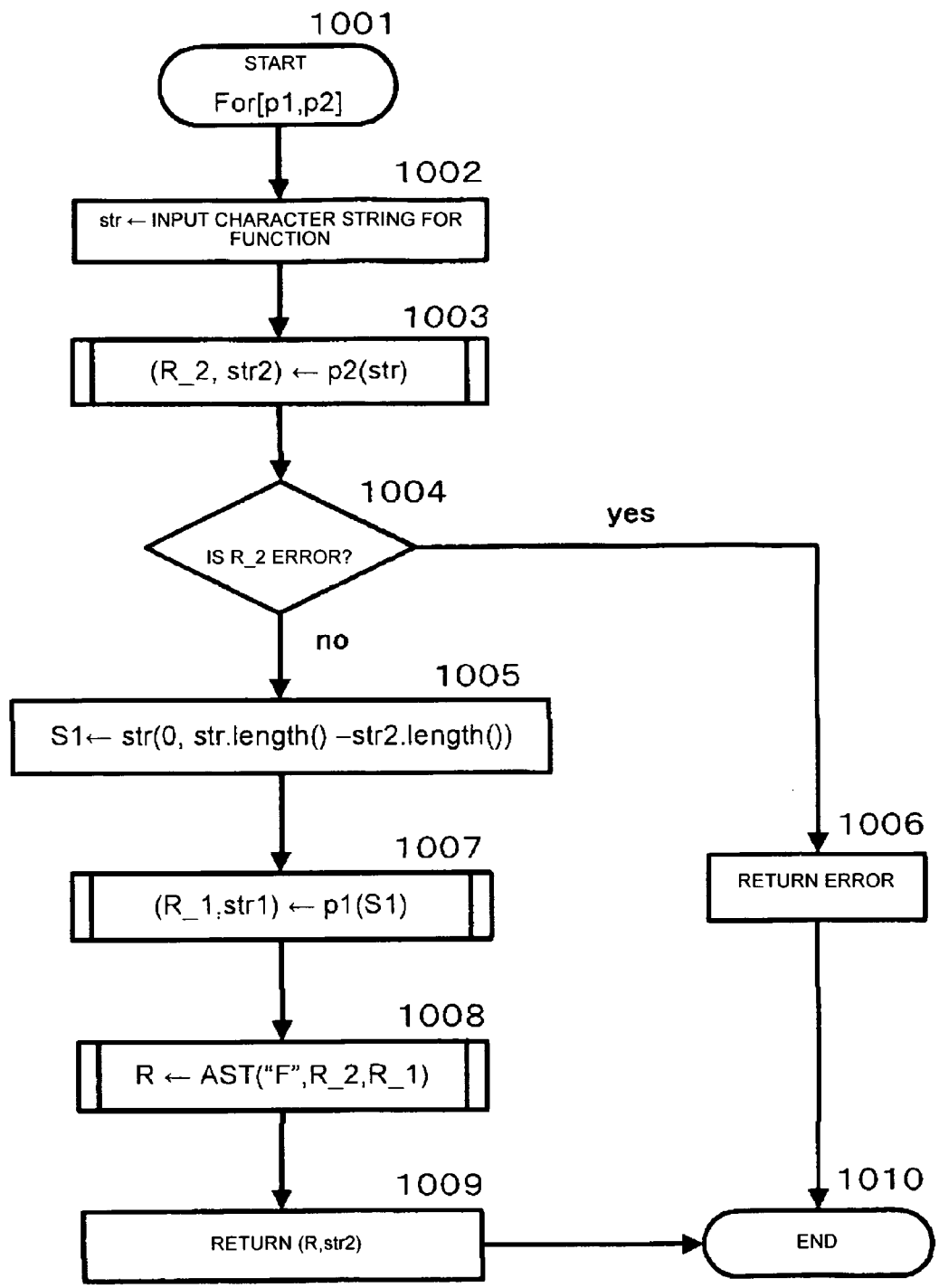
FIG. 10 illustrates a flowchart showing parsing operation of a function For[p1,p2] generated in FIG. 8.

In the case of the grammar description P=P1 F P2, the first parser generation unit (308) recursively creates parser parts p1 and p2 from P1 and P2, and generates a code for performing operation based on a flowchart shown in FIG. 10, for example.

Figure 7B:
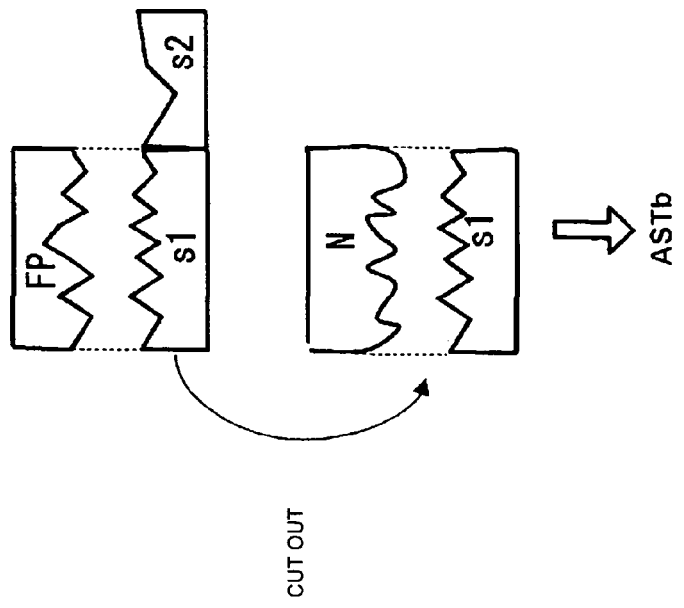
FIG. 7(b) illustrates a schematic view of parsing operations of parsers associated with one of the newly added grammar descriptions shown in FIG. 6.
Figure 7A:
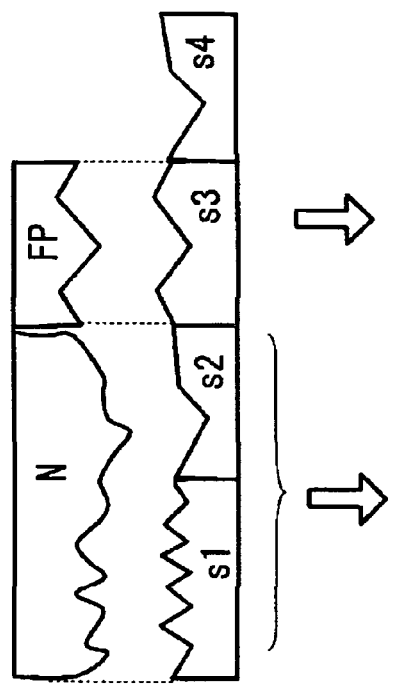
FIG. 7(a) illustrates a schematic view of parsing operations of parsers associated with one of the newly added grammar descriptions shown in FIG. 6.

FIG. 7A and FIG. 7B each show a schematic view of parsing operation of a parser associated with each of the newly added grammar descriptions shown in FIG. 6.

In the example in FIG. 7A, an input character string is s, specifically s=s1s2s3s4. It is not possible to specify that N is to be applied to a part indicated by N in FIG. 7A, only by using the existing PEGs. To address this problem, a combination pattern N U FP is used in this embodiment of the present invention. N U FP is based on the grammar description P1 U P2.

The processing of the combination parser in FIG. 7A is as follows:

(1) to determine that there is no character string part first acceptable by FP in the character string part from the first character string of the input character string to a character string part immediately before a character string part s3, and that the character string part s3 is the first character string part acceptable by FP;

(2) accordingly to parse the character string part from the first character string to the character string part immediately before the character string part s3, i.e., a character string part s1s2, by using N, and then to parse the part s3 in the remaining character string s3s4 by using FP; (3) to construct an abstract syntax tree 1 (also referred to as AST1, below) on the basis of the character string part s1s2 by using N; to construct an abstract syntax tree 2 (also referred to as AST2, below) on the basis of the character string part s3 by using FP; thereby to construct an abstract syntax tree a (also referred to as ASTa, below) having U as its root, by combining AST1 and AST2 by using U; (4) and consequently to return ASTa and the remaining character string part s4 as a result of parsing the character string s1s2s3s4 on the basis of N U FP.

In the example in FIG. 7B, an input character string is s, specifically s=s1s2. It is not possible to specify that N is to be applied to the part indicated by N in FIG. 7B, only by using the existing PEGs. To address this problem, a combination pattern N F FP is used in this embodiment of the present invention. N F FP is based on the grammar description P1 F P2.

The processing of the combination parser in FIG. 7B is as follows: (1) to determine that the first character string s1 of the input character string is acceptable by FP; (2) to cut out the first character string s1 acceptable by FP, and then to parse the cut-out s1 by using N; (3) to construct an abstract syntax tree b (also referred to as ASTb, below) on the basis of the character string part s1, as a result of parsing using N; and consequently to return ASTb and the remaining character string part s2 as a result of parsing the character string s1s2 on the basis of N F FP.

Figure 8:
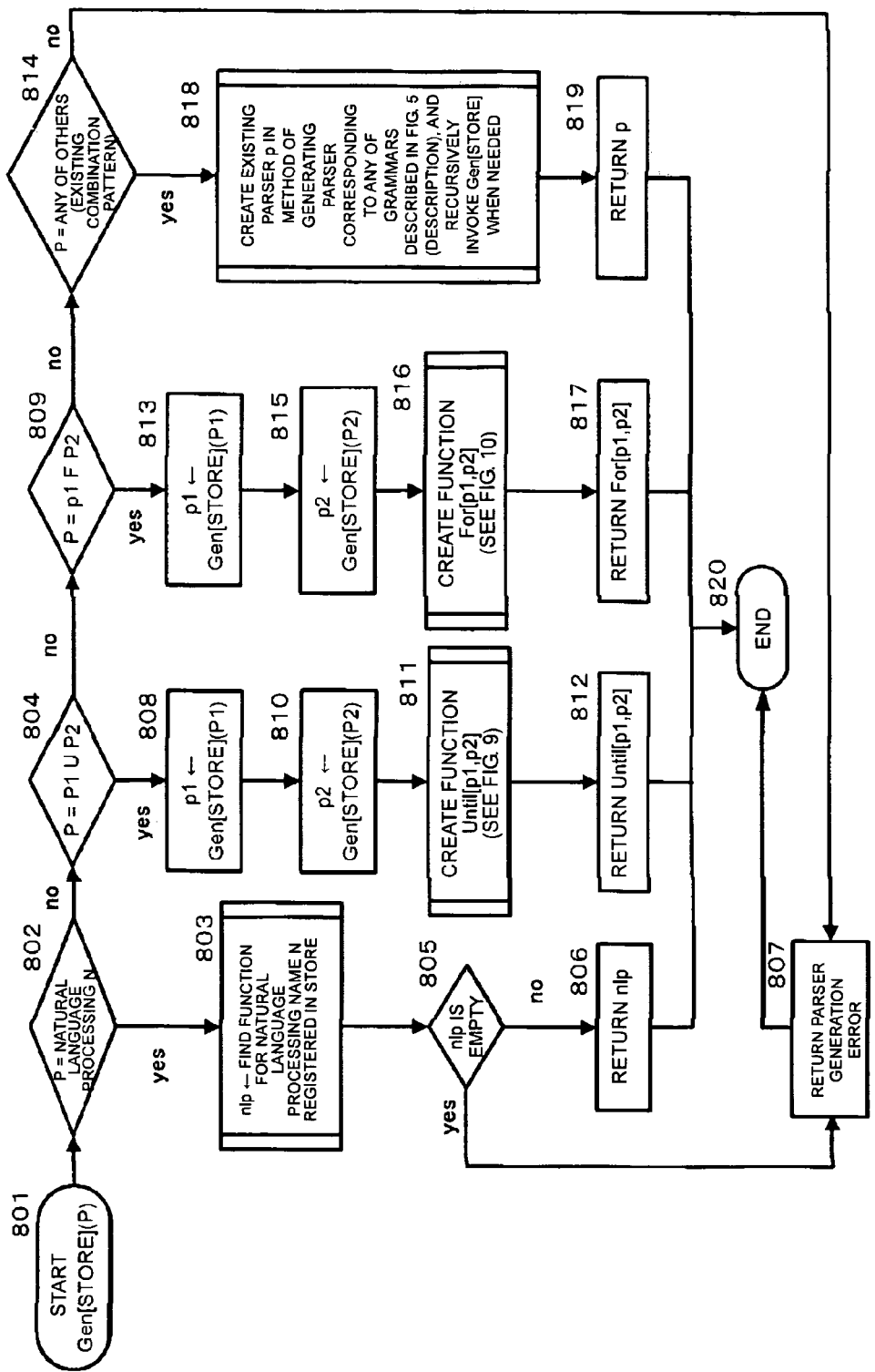
FIG. 8 illustrates a flowchart of processing for generating a parser combination according to an embodiment of the present invention, by using the grammar descriptions shown in FIG. 6.

FIG. 8 shows a flowchart of processing Gen[STORE](p) for generating a parser p in processing Main[STORE] for generating a parser combination, which is the embodiment of the present invention, by using the grammar descriptions shown in FIG. 5.

Definitions used in the processing Main[STORE] and the processing Gen[Store](p) will be described below.

STORE: is the natural language processing registration store (305).

P: is a grammar description. The grammar description is described in a declarative description on the basis of a predetermined grammar by a user, for example.

Main[STORE]: is processing for generating a parser combination p on the basis of a grammar description P under the natural language processing registration store (305).

Gen[Store](P): is processing for identifying combinations from the grammar description P and generating a parser combination p on the basis of the identified grammar description.

Firstly, Main[STORE] will be described.

In Step 1, the interpretation unit (306) receives a declarative description including a grammar description P from the first editing unit (302). Here, the declarative description can be registered to a declarative description library in advance.

In Step 2, the interpretation unit (306) performs Gen[STORE](P).

In Step 2-1, by parsing the declarative description, top-level combination patterns of the grammar description P are identified. The grammar description P is, for example, any of s, eoi, X, P1;P2, P1/P2 P*, &(P1)P2, !(P1)P2, N, P1 U P2 and P1 F P2 shown in FIG. 6. Here top level means the outermost combination of those described by the grammar description.

For example, when the grammar description P is ((P1;P2) U P3), the top-level combination is (P1;P2) and P3 combined by U. Moreover, when the identified grammar description P is P1;(P2 U P3), the top-level combination is P1 and (P2 U P3) combined by ;. Identification of combination patterns at levels lower than the top level is performed by recursively applying Gen in Steps 808, 810, 813, 815 and 818 in FIG. 8.

In Step 2-2-1, when the grammar description P is any one of s, eoi, X and N, the parser p can be generated on the basis of the identified grammar description P. Here, the second parser generation unit (309) can generate a parser for each of s, eoi and X, on the basis of the existing technique using the PEGs. The assignment unit (307) can generate a parser for N by processing shown in Steps 808 to 812 in FIG. 8.

In Step 2-2-2-1, the first parser generation unit (308) generates a parser p1 on the basis of a grammar description P1. For example, when the identified grammar description P is ((P1;P2) U P3), P1 is (P1;P2). Meanwhile, when the identified grammar description P is P1;(P2 U P3), P1 is P1. The first parser generation unit (308) recursively invokes Gen[STORE](p1).

In Step 2-2-2-2, the first parser generation unit (308) generates a parser p2 on the basis of a grammar description P2. For example, when the identified grammar description P is ((P1;P2) U P3), P2 is P3. Meanwhile, when the identified grammar description P is P1;(P2 U P3), P2 is (P2 U P3). The first parser generation unit (308) recursively invokes Gen[STORE](P2 U P3). In the invoked processing, P2 and P3 are identified as a top-level combination pattern, and are then further analyzed.

In Step 2-2-2-3, the first parser generation unit (308) generates a parser combination p by combining the parser p1 and the parser p2 on the basis of the identified combination pattern. Here, generation of the parser combination p is determined for each of the combination patterns identified in Step 2-1.

In Step 3, the interpretation unit (306) returns a code of the parser p generated in Step 2-2-2-3 or an execution object (e.g., reference to a function) of the parser p.

In the following, an example of Gen[STORE](p) described in Step 2 above will be described by following Steps 801 to 820.

In Step 801, the interpretation unit (306) receives a declarative description including a grammar description P from the first editing unit (302), and then starts Gen[STORE](P) to generate a parser p. The interpretation unit (306) parses the declarative description, and then identifies top-level combination patterns first.

In Step 802, the interpretation unit (306) judges whether each of the identified grammar descriptions is natural language processing N. The interpretation unit (306) advances to Step 803 if P is natural language processing N, while advancing to Step 804 if P is not N.

In Step 803, in response to the fact that the identified grammar description P is natural language processing N, the assignment unit (307) finds a natural language processing function having the name N registered to STORE, and then substitutes the natural language processing function for a variable nlp.

In Step 805, the assignment unit (307) advances to Step 806 if nlp is not empty (null), while advancing to Step 807 if nlp is null. In Step 807, which is error processing, in response to the fact that nlp is null, a message indicating a parser generation error is returned to the parser generator. Then, the processing continues to Step 820.

In Step 806, in response to that fact that nlp is not null, the assignment unit (307) returns a parser nlp. The returned nlp is a processing function associated with the natural language processing function N.

In Step 804, in response to the fact that the identified grammar description P is not natural language processing N, the interpretation unit (306) judges whether P is P1 U P2. The interpretation unit (306) advances to Step 808 if P is P1 U P2, while advancing to Step 809 if P is not P1 U P2.

In Step 808, the first parser generation unit (308) generates a parser p1 on the basis of the grammar description P1. The generation processing is represented by Gen[STORE](P1).

In Step 810, the first parser generation unit (308) generates a parser p2 on the basis of the grammar description P2. This generation processing is represented by Gen[STORE](P2).

In Step 811, the first parser generation unit (308) generates a processing function Until[p1,p2] by combining the parser p1 from Step 808 and the parser p2 from Step 810. Until[p1,p2] is a parser combination, and is the code of a function having str as its argument. Generation of Until[p1,p2] can be performed by generating the processing (code) corresponding to the flowchart showing parsing operation based on Until[p1,p2] in FIG. 9.

Figure 9:
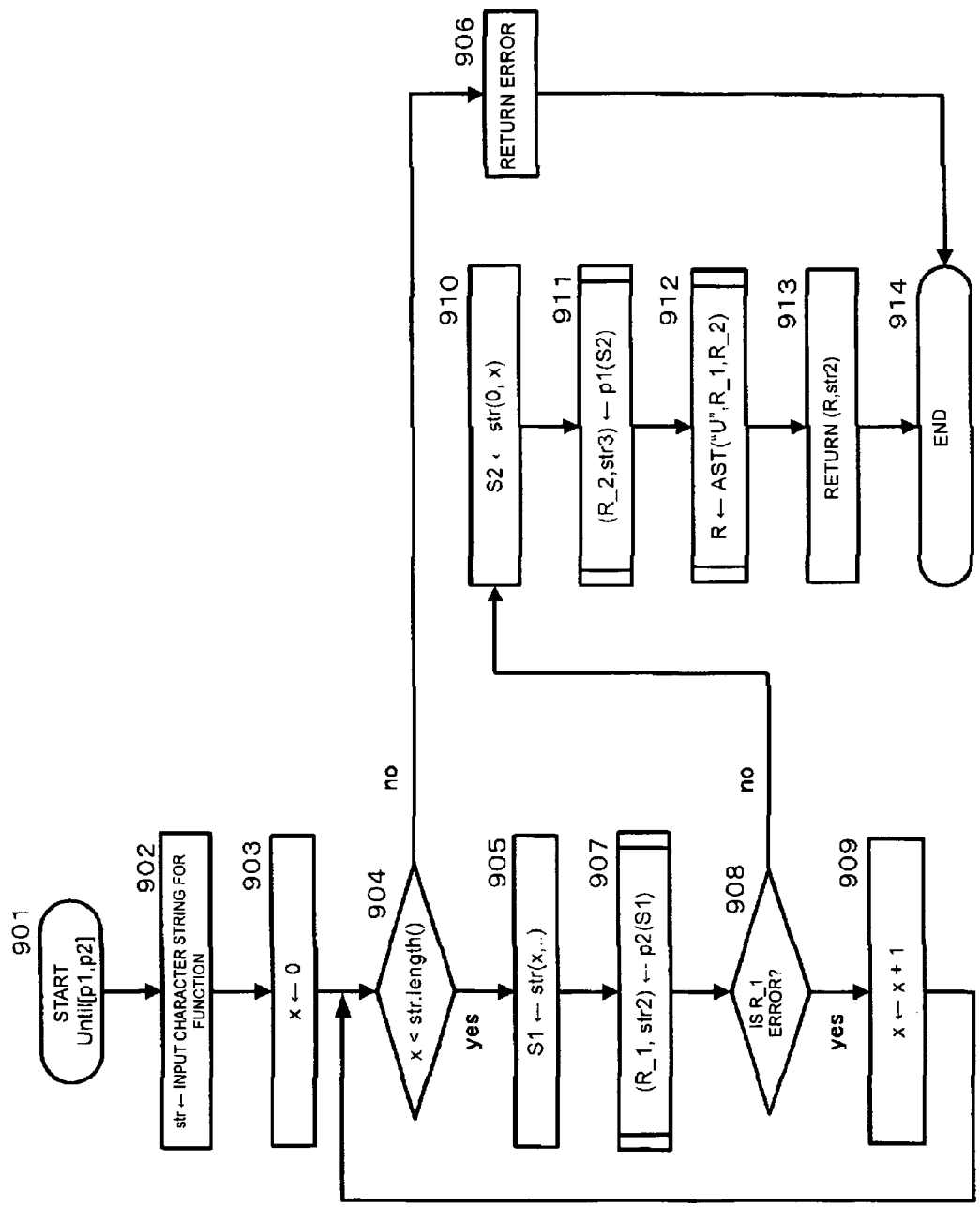
FIG. 9 illustrates a flowchart showing parsing operation of a function Until[p1,p2] generated in FIG. 8.

In other words, the flowchart shown in FIG. 9 represents a function having p1 and p2 as its parameters, and hence the processing (code) corresponding to FIG. 9 is determined when p1 and p2 are given, and can thereby be performed.

In Step 812, the first parser generation unit (308) returns Until[p1,p2]. Then, this processing continues to Step 820.

In Step 809, in response to the fact that the identified grammar description P is not P1 U P2, the interpretation unit (306) judges whether P is P1 F P2. The interpretation unit (306) advances to Step 813 if the identified grammar description P is P1 F P2, while advancing to Step 814 if P is not P1 F P2.

In Step 813, the first parser generation unit (308) generates a parser p1 on the basis of the grammar description P1. This generation processing is represented by Gen[STORE](P1).

In Step 815, the first parser generation unit (308) generates a parser p2 on the basis of the grammar description P2. This generation processing is represented by Gen[STORE](P2).

In Step 816, the first parser generation unit (308) generates a processing function For[p1,p2] by combining the parser p1 from Step 813 and the parser p2 from Step 815. For[p1,p2] is a parser combination, and is the code of a function having str as its argument. Generation of For[p1,p2] can be performed by generating the processing (code) corresponding to the flowchart showing parsing operation based on For[p1,p2] in FIG. 10.

In other words, the flowchart shown in FIG. 10 represents the function having p1 and p2 as its parameters, and hence the processing (code) corresponding to FIG. 10 is determined when p1 and p2 are given, and can thereby be performed.

In Step 817, the first parser generation unit (308) returns the processing function For[p1,p2]. Then, this processing continues to Step 820.

In Step 814, in response to the fact that the identified grammar description P is not P1 F P2, the interpretation unit (306) judges whether P is any of the rules other than N, P1 U P2 and P1 F P2 (the rules other than the part surrounded by a dotted line in FIG. 6, i.e., the existing rules), while advancing to Step 807 if P is not an existing rule. The interpretation unit (306) advances to Step 818 if P is an existing rule, while advancing to Step 807 if P is not an existing rule.

In Step 807, which is error processing, in response to the fact that P is not an existing rule, a message indicating a parser generation error is returned to the parser generator. Then, this processing continues to Step 820.

In Step 818, the second parser generation unit (309) generates a parser p on the basis of the corresponding existing rule. The process of generating a parser on the basis of an existing rule is as described above as a method for generating a parser associated with any of the grammar descriptions described in FIG. 5. Then, the interpretation unit (306) recursively invokes Gen[STORE] as needed.

For example, in the case of P=P1;P2, Gen[STORE](P1) and Gen[STORE](P2) are invoked, and a parser is generated by combining the two parsers obtained as results of the processing on the basis of the grammar description; shown in FIG. 6.

In Step 819, the second parser generation unit (309) returns a parser p. Then, this processing continues to Step 820.

In Step 820, the interpretation unit (306) terminates Gen [STORE](P), and advances to Step 3 described above.

Each of the processing functions returned in Steps 806, 812, 817 and 819 is either returned without any further operation or combined with a parser generated separately on the basis of grammar descriptions in the declarative description. For example, when the grammar description in the declarative description is P1;(P2 U P3), a parser p1 is generated on the basis of recursively invoked Gen[STORE](P1), and then (P2 U P3) is returned in Step 819.

Moreover, a parser p23 is generated on the basis of recursively invoked Gen[STORE](P2 U P3), and a parser Until[p1, p2] is returned in Step 812. Thereafter, a parser obtained by combining the parser p1 and the parser p23 using ";" is generated in Step 818.

FIG. 9 shows a flowchart showing parsing operation of the processing function Until[p1,p2] generated in Step 811 in FIG. 8.

Definitions used in the flowchart will be described below.

p1, p2: are parser functions.

s(i,j): is a character string corresponding to index i~(j−1) of the input character string s.

s(k,..): is a character string corresponding to index k~(s.length( )−1) of the input character string s.

AST("U",R1,R2): is processing for creating a new abstract syntax tree setting a label U as its parent node and abstract syntax trees R1 and R2 as its child nodes.

In Step 901, the parser execution unit (403) starts processing for parsing the input character string by using Until [p1.p2].

In Step 902, the parser execution unit (403) substitutes the input character string s to be parsed by using Until[p1,p2] for the variable str.

In Step 903, the parser execution unit (403) initializes a variable x representing the pointer for the character string. Through this initialization, the pointer of the character string is set to indicate the first character string of the input character string.

In Step 904, when str.length( ) is larger than the variable x, i.e., when the length of the input character string s is larger than the position to which the pointer indicates in the character string, the parser execution unit (403) advances to Step 905 since there is a character string to be processed. When the variable x is larger than str.length( ) i.e., when the length of the input character string s is smaller than the position to which the pointer indicates in the character string, on the other hand, the parser execution unit (403) advances to Step 906 since there is no character string to be processed.

The processing in Steps 904 to 909 is repeated for each of the input character strings from the first character string to the last character string of the input character string s. Step 906 is error processing for returning an error.

In Step 905, the parser execution unit (403) cuts out a character string part from the position of the variable x to the last character string of the input character string s, and then stores the cut-out character string part in S1.

In Step 907, the parser execution unit (403) parses the cut-out character string part S1 by using p2. If the parsing is terminated normally, the parser execution unit (403) returns an abstract syntax tree (R_1) as a parsing result for the character string part parsed by using p2, and also returns, as str2, the remaining character string, which is not processed by using p2, in the character string part S1.

In Step 908, the parser execution unit (403) judges whether p2 cannot accept the character string part S1. If R_1 is an error, this means that no character string part which can be parsed by using p2 has been found, and the parser execution unit (403) advances to Step 909 to search for a character string part which can be parsed by using p2. If R_1 is not an error, on the other hand, this means that a part which can be parsed by using p2 is found in the input character string, and the parser execution unit (403) advances to Step 910.

In Step 909, the parser execution unit (403) adds 1 to the variable x, and moves the pointer position by 1 in the character string. Then, these processing returns to Step 904, and Steps 904 to 908, are repeated.

In Step 910, the parser execution unit (403) cuts out the character string part from the first character string to the character string immediately before the position of the variable x, and then stores the cut-out character string part in S2.

In Step 911, the parser execution unit (403) parses the cut-out character string S2 by using p1. If the parsing is terminated normally, the parser execution unit (403) returns an abstract syntax tree (R_2) as a result of parsing using p1, and also returns, as str3, the remaining character string, which is not processed by using p1, in the character string part S2. Here, str3 is a character string ϵ, which is empty when p2 is a natural language processing function.

In Step 912, the parser execution unit (403) combines the abstract syntax tree (R_1) from Step 907 and the abstract syntax tree (R_2) from Step 911 by a root U, and thereby creates an abstract syntax tree (R).

In Step 913, the parser execution unit (403) returns, as a parsing result, the abstract syntax tree (R) from Step 912 and the remaining character string str2 (from Step 907), which is not processed by using p2, in the character string part S1.

In Step 914, the parser execution unit (403) terminates the parsing processing based on Until[p1,p2].

FIG. 10 shows a flowchart showing parsing operation based on the processing function For[p1,p2] generated in Step 816 in FIG. 8.

Definitions used in the flowchart will be described below.

p1, p2: are parser functions generated respectively on the basis of P1 and P2.

s(i,j): is a character string corresponding to index i~(j−1) of the input character string s.

s(k,..): is a character string corresponding to index k~(s.length( )−1) of the input character string s.

AST("F",R1,R2): is processing for creating a new abstract syntax tree setting a label F as its parent node and the abstract syntax trees R1 and R2 as its child nodes.

In Step 1001, the parser execution unit (403) starts processing for parsing the input character string by using For[p1,p2].

In Step 1002, the parser execution unit (403) substitutes, for the variable str, the input character string s to be parsed by using For[p1,p2].

In Step 1003, the parser execution unit (403) parses the character string str by using p2. If the processing is terminated normally, the parser execution unit (403) returns an abstract syntax tree (R_2) (not illustrated) as a parsing result of the character string part parsed by suing p2, and returns, as a character string part str2, the remaining character string, which is not processed by p2, in the input character string.

In Step 1004, the parser execution unit (403) judges whether p2 cannot accept the character string part str2. If R_2 is an error, the parser execution unit (403) advances to Step 1005 since there can still be a part which can be parsed by using p2 in the input character string. If R_2 is not an error, on the other hand, the parser execution unit (403) advances to Step 1006 since there is no part which can be parsed by using p2 in the input character string. Step 1006 is error processing for returning an error.

In Step 1005, the parser execution unit (403) cuts out a character string part str(0,str.length( )−str2.length( )), which is a character string part obtained by eliminating the character string part from the first character string to the character string part immediately before the character string part str1, from the entire input character string s, and then stores the cut-out character string part in S1. Here, str2 in str(0,str.length( )−str2.length( )) is the same as str2 in Step 903.

In Step 1007, the parser execution unit (403) parses the cut-out character string S1 by using p1. If the processing is terminated normally, the parser execution unit (403) returns the abstract syntax tree (R_1) as a result of the parsing using p1, and also returns, as str1, the remaining character string, which is not processed by using p1, in the character string part S1. Here, str1 is a character string ϵ, which is empty when N is a natural language processing function.

In Step 1008, the parser execution unit (403) combines the abstract syntax tree (R_2) from Step 1003 and the abstract syntax tree (R_1) from Step 1006 by a root F, and creates an abstract syntax tree (R). Alternatively, instead of creating the abstract syntax tree (R), the parser execution unit (403) can return, as a parsing result, the abstract syntax tree (R_1) from Step 1006 and the remaining character string str2, which is not processed by using p2 in Step 1003. The reason why only the abstract syntax tree (R_1) from Step 1006 is because, if abstract syntax trees are combined, unnecessary information is also included in the resultant abstract syntax tree, and it is conceivable that the subsequent processing can be complicated.

In Step 1009, the parser execution unit (403) returns the abstract syntax tree (R) from Step 1008 and the remaining character string str2, which is not processed by using p2 in Step 1003, in the character string part S1.

In Step 1010, the parser execution part (403) terminates the parsing processing based on For[p1,p2].

Figure 11:
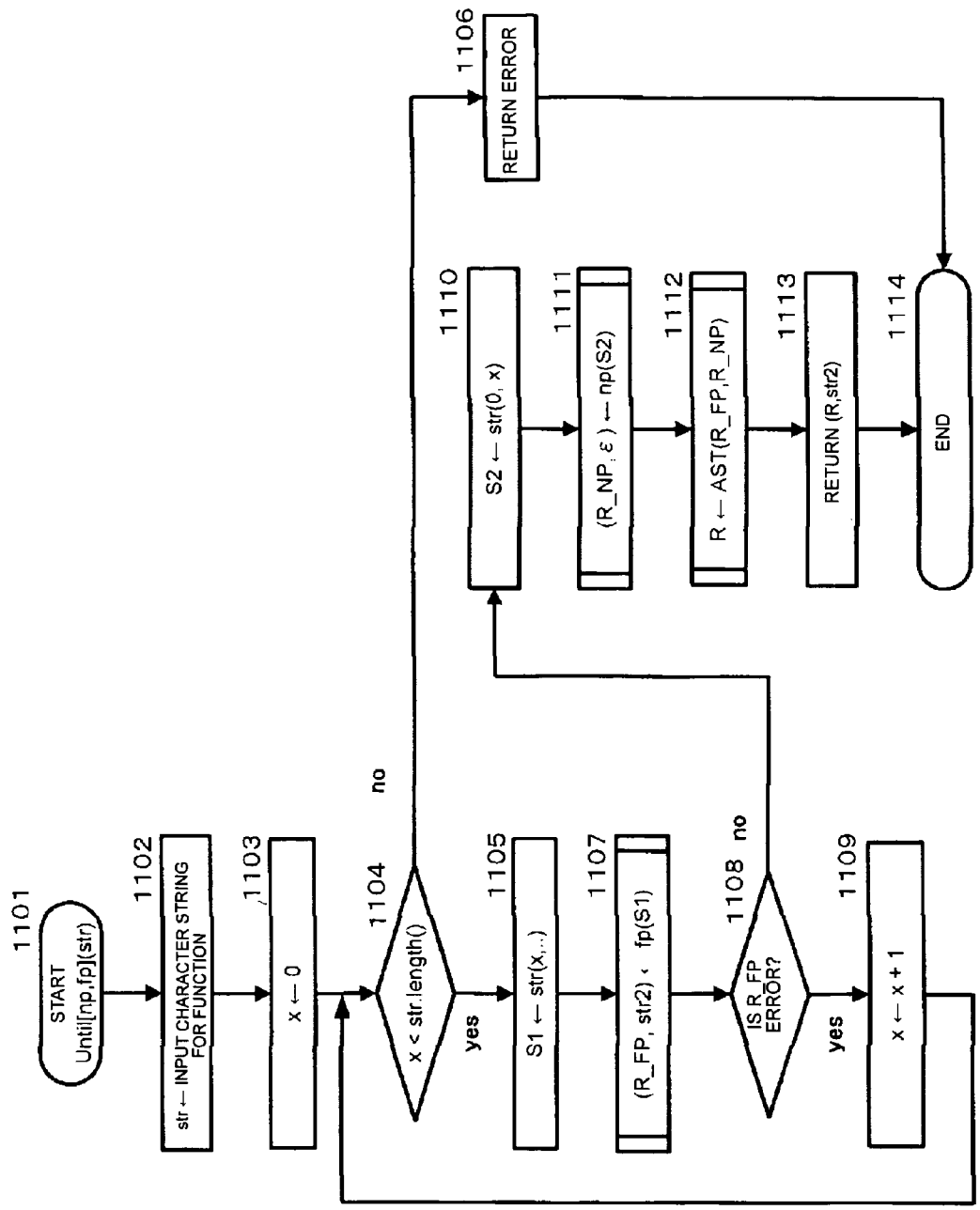
FIG. 11 illustrates a flowchart showing parsing operation of a function Until[np,fp] in the case where P=P1 U P2 shown in FIG. 9 is P NP U FP.

FIG. 11 shows a flowchart showing parsing operation based on the processing function Until[np,fp] in the case of P=P1 U P2 shown in FIG. 9 where P1 is NP and P2 is FP (P=NP U FP).

The flowchart in FIG. 11 corresponds to the parsing operation shown in the schematic view in FIG. 7A.

Definitions used in the flowchart in FIG. 11 will be described below.

str: is an input character string (c is an empty character string) to be parsed.

fp: is a parser generated on the basis of the grammar description FP, and is a formal language processing parser, for example.

np: is a parser generated on the basis of the grammar description NP, and is a natural language processing function, for example.

s(i,j): is a character string corresponding to index i~(j−1) of the input character string s.

s(k,..): is a character string corresponding to index k~(s.length( )−1) of the input character string s.

AST(R1,R2): is a function for creating a syntax tree having syntax trees R1 and R2 combined as its child nodes.

fp(S), np(S): indicate to parse the character string S by using fp or np and then return a result.

In Step 1101, the parser execution unit (403) starts processing for parsing the input character string by using Until[np,fp].

In Step 1102, the parser execution unit (403) substitutes, for the variable str, the input character string s to be parsed by using Until[np,fp].

In Step 1103, the parser execution unit (403) initializes the variable x representing the pointer for the character string. Through this initialization, the pointer of the character string is set to indicate the first character string of the input character string.

In Step 1104, when str.length( )is larger than the variable x, i.e., when the length of the input character string s is larger than the position to which the pointer indicates in the character string, the parser execution unit (403) advances to Step 1105 since there is a character string to be processed. When the variable x is larger than str.length( ) i.e., when the length of the input character string s is smaller than the position to which the pointer indicates in the character string, on the other hand, the parser execution unit (403) advances to Step 1106 since there is no character string to be processed.

The processing in Steps 1104 to 1109 is repeated for each of the input character strings from the first character string to the last character string of the input character string s. Step 1106 is error processing for returning an error.

In Step 1105, the parser execution unit (403) cuts out a character string part from the position of the variable x to the last character string of the input character string s, and then stores the cut-out character string part in S1.

In Step 1107, the parser execution unit (403) parses the cut-out character string part S1 by using fp. If the parsing is terminated normally, the parser execution unit (403) returns an abstract syntax tree (R_FP) as a parsing result for the character string part parsed by using fp, and also returns, as a character string part str2, the remaining character string, which is not processed by using fp, in the character string part S1.

Step 1107 will be described as follows on the basis of FIG. 7A: the parser execution unit (403) parses the cut-out character string parts s3 and s4 by using FP; and if the parsing is terminated normally, the parser execution unit (403) returns an abstract syntax tree AST2 as a result of parsing the character string part (s3) by using FP and returns, as a character string part s4, the remaining character string, which is not processed by using FP, in the character string part s.

In Step 1108, the parser execution unit (403) judges whether fp cannot accept the character string part S1. If R_FP is an error, this means that no character string part which can be parsed by using fp has been found, and the parser execution unit (403) advances to Step 1109 to search for a character string part which can be parsed by using fp. If R_FP is not an error, on the other hand, this means that a part which can be parsed by using fp is found in the input character string, and the parser execution unit (403) advances to Step 1110.

In Step 1109, the parser execution unit (403) adds 1 to the variable x, and moves the pointer position by 1 in the character string. Then, this processing returns to Step 1104, and Steps 1104 to 1108 are repeated.

In Step 1110, the parser execution unit (403) cuts out the character string part from the first character string to the character string immediately before the position of the variable x, and then stores the cut-out character string part in S2. Step 1110 will be described as follows on the basis of FIG. 7A: the parser execution unit (403) cuts out the character string parts s1 and s2, which are from the first character string to the variable 2 immediately before the variable 3, and then stores the cut-out character string parts s1 and s2 in S2.

In Step 1111, the parser execution unit (403) parses the cut-out character string S2 by using np. If the parsing is terminated normally, the parser execution unit (403) returns an abstract syntax tree (R_NP) as a result of parsing using np, and also returns, as an empty character string $\epsilon$, the remaining character string, which is not processed by using np, in the character string part S2. Here, np is a character string processing function, and hence the empty character string $\epsilon$ is returned as the parsing result.

Step 1111 will be described as follows on the basis of FIG. 7A: the parser execution unit (403) parses the cut-out character strings s1 and s2 by using NP, and returns an abstract syntax tree AST1 as a result of parsing using NP when the parsing is terminated normally.

In Step 1112, the parser execution unit (403) combines the abstract syntax tree (R_FP) from Step 1107 and the abstract syntax tree (R_NP) from Step 1111 by the root U, for example, and thereby creates an abstract syntax tree (R). Step 1112 will be described as follows on the basis of FIG. 7A: the parser execution unit (403) combines the abstract syntax tree AST2 from Step 1107 and the abstract syntax tree AST1 from Step 1111 by the root U, and thereby creates an abstract syntax tree ASTa.

In Step 1113, the parser execution unit (403) returns, as a parsing result, the abstract syntax tree (R) from Step 1112 and the remaining character string str2 (from Step 1107), which is not processed by using fp, in the character string part S1.

In Step 1114, the parser execution unit (403) terminates the parsing processing based on Until[np,fp].

FIG. 12 shows a flowchart showing parsing operation based on the processing function For[np,fp] in the case of P=P1 F P2 shown in FIG. 10 where P1 is NP and P2 is FP (P=NP F FP).

The flowchart in FIG. 12 corresponds to the parsing operation shown in the schematic view in FIG. 7B.

Definitions used in the flowchart in FIG. 12 are the same as those used in the flowchart in FIG. 11.

In Step 1201, the parser execution unit (403) starts processing for parsing the input character string (variable str) by using For[np,fp].

In Step 1202, the parser execution unit (403) substitutes, for the variable str, the input character string s to be parsed by using For[np,fp].

In Step 1203, the parser execution unit (403) parses the character string str by using fp. If the parsing is terminated normally, the parser execution unit (403) returns an abstract syntax tree (R_FP) (not illustrated) as a result of parsing the character string part parsed by using fp, and returns, as a character string part str1, the remaining character string, which is not processed by using fp, in the input character string.

Step 1203 will be described as follows on the basis of FIG. 7B: the parser execution unit (403) parses the character string s1s2 by using FP, and then returns, as a character string part str2, the remaining character string s2, which is not processed by FP, in the input character string.

In Step 1204, the parser execution unit (403) judges whether fp cannot accept the character string part str. If R_FP is not an error, the parser execution unit (403) advances to Step 1205 since there can still be a part which can be processed by using fp in the input character string. If R_FP is an error, on the other hand, the parser execution unit (403) advances to Step 1206 since there is no part which can be processed by using fp in the input character string. Step 1206 is error processing for returning an error.

In Step 1205, the parser execution unit (403) cuts out a character string part str(0,str.length( )–str1.length( )), which is a character string part obtained by eliminating the character string part from the first character string to the character string part immediately before the character string part str1, from the entire input character string s, and then stores the cut-out character string part in S1. Here, str1 in str(0,str.length( )–str1.length( )) is the same as str1 in Step 1203.

In Step 1207, the parser execution unit (403) parses the cut-out character string S1 by using np. If the processing is terminated normally, the parser execution unit (403) returns an abstract syntax tree (R_NP) as a result of the parsing using np, and also returns, as an empty character string $\epsilon$, the remaining character string, which is not processed by using np, in the character string part S1. Step 1207 will be described as follows on the basis of FIG. 7B: the parser execution unit (403) parses the cut-out character string s1 by using N, and then returns an abstract syntax tree ASTb as the parsing result if the parsing is terminated normally.

Here, in the case of FIG. 7B, the character string returned as a part of the result of the parsing using N is an empty character string.

In Step 1208, the parser execution unit (403) combines the abstract syntax tree (R_FP) from Step 1203 and the abstract syntax tree (R_NR) from Step 1206 by a root F, and creates an abstract syntax tree (R). Alternatively, instead of creating the abstract syntax tree (R), the parser execution unit (403) can return the abstract syntax tree (R_NP) from Step 1206 and the remaining character string str1, which is not processed by using fp in Step 1203.

In Step 1209, the parser execution unit (403) returns the abstract syntax tree (R) from Step 1208 and the remaining character string str1, which is not processed by using fp in Step 1203, in the character string part S1.

In Step 1210, the parser execution part (403) terminates the parsing processing based on For[np,fp].

FIG. 13 shows an example of extracting information from an input text by using the parser combination generated according to the embodiment of the present invention described in FIG. 8.

A specific (Result-And-Conditions Pattern) form is used, for example, to describe setting of an item value on a screen in a web system screen specification. 1301 shows two examples of a text according to the specific form.

The entire structures (although underlined parts are excluded) of textS 1302 1303 are described according to the specific form. Specifically, the text 1302 includes a formal description "if all the subsequent conditions are met," and hereunder includes descriptions each having a high level of flexibility in content. Meanwhile, the text 1303 includes a formal description "if all the following conditions are met," and hereunder includes descriptions each having a high level of flexibility in content.

Assume that a user desires to parse these texts as follows:

(1) desires to check whether the entire structure (although the underlined parts are excluded) of each text is according to the specific form; and (2) desires to extract pairs each having an is-a relationship by applying a specific natural language processing is-a-NPL only to the specific parts of the texts (the underlined parts in the text 1302 and the text 1303).

In view of the above, the user creates a declarative description (1304) including a grammar description combination pattern by using the first editing unit (302). In the grammar description combination 1304, a grammar description rule P1 U P2 (i.e., FP U NP) is used. Moreover, in the grammar description combination 1304, [is-a-NLP] specifies the name of an is-a-NLP parser, and indicates a part to which the is-a-NLP parser is to be applied. Here, "/" in (if all the subsequent conditions are met/if all the following conditions are met) means "or" with priority, and specifically means to parse "if all the subsequent conditions are met" and to parse, if the above parsing is not possible, "if all the following conditions are met". Further, in the grammar description combination 1304, + means repeating [is-a-NLP]U<line feed> one or more times.

The declarative description is transmitted from the first editing unit (302) to a parser generator (1305). The parser generator (1305 corresponding to 301 in FIG. 3) automatically generates a parser combination (code) (1306) according to the combination pattern in the grammar description in the declarative description (1304). The compiler (402) converts the generated parser combination (code) (1306) into an executable code thereof.

1307 shows a result of parsing the text 1302 and the text 1303 by using the above executable code. The parser combination can parse the texts having the specific form as follows: (1) to parse for checking that the entire text structures (although the underlined parts are excluded) are according to the specific form; and (2) to parse for extracting pairs each having an is-a relationship by applying the specific natural language processing (is-a-NLP) only to the specific parts (underlined parts) of the texts.

The parsing result can be shown in a text form as shown in 1307 or as an abstract syntax tree (AST) corresponding to the text form. Any method known to those skilled in the art can be used as a method for expressing a parsing result.

FIG. 14 shows examples of grammar descriptions which are created by the user for the examples shown in 1301 in FIG. 13.

The declarative description 1401 includes multiple grammar descriptions. The grammar descriptions are based on the descriptions in FIG. 6.

In the declarative description shown in FIG. 14, the top-level combination of the grammar descriptions is S::=P1;P2.

A grammar description P1 at the top level further includes a grammar description P12/P13 (first sub-level).

The grammar description P12 at the sub-level is specified by a formal language part, and is specified by "if all the subsequent conditions are met".

The grammar description P13 at the sub-level is specified by a formal language part, and is specified by "if all the following conditions are met".

The grammar description P2 at the top level further includes a grammar description P3;P4 (first sub-level).

The grammar description P3 at the sub-level is specified by a forma language part, and is specified by ";" (a character subsequent to "met").

The grammar description P4 at the sub-level further includes a grammar description P5;P6 (second sub-level).

The grammar description P5 at the sub level further includes a grammar description Pn U P8 (third sub-level).

The grammar description P6 at the sub level further includes a grammar description P7;P7* (third sub-level).

The grammar description Pn designates the natural language processing function [is-a-NLP].

The grammar description P8 designates line feed.

The grammar description P7 includes a grammar description Pn U P8 (fourth sub-level).

As described above, the declarative description is based on the grammar descriptions shown in FIG. 6, and the grammar descriptions are specified by sequentially analyzing the grammar descriptions from the top level to the sub levels.

Figure 15:
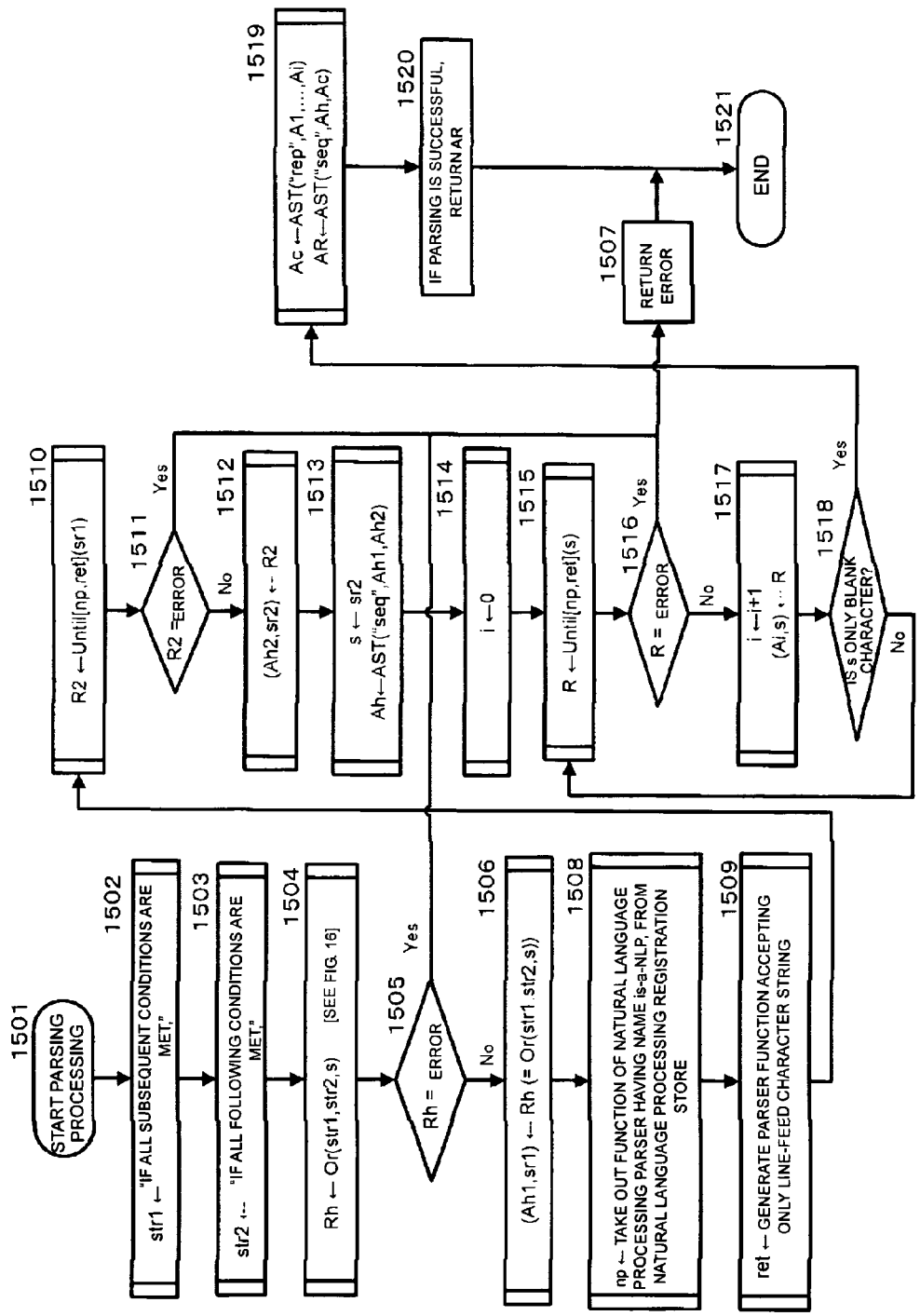
FIG. 15 illustrates a flowchart showing a parsing operation of a parser combination generated in the example shown in FIG. 13.

FIG. 15 shows a flowchart showing parsing operation of the parser combination (1305) generated in the example of the grammar description (1304) shown in FIG. 13.

In Step 1501, the parser execution unit (403) starts processing for parsing the texts (1302 and 1303) shown in FIG. 13 by use of the parser combination.

Steps 1502 to 1506 show processing for parsing the part (if all the subsequent conditions are met/if all the following conditions are met) in 1304 in FIG. 13.

In Step 1502, the parser execution part (403) stores the character string "if all the subsequent conditions are met," in the variable str1.

In Step 1503, the parser execution part (403) stores the character string "if all the following conditions are met," in the variable str2.

In Step 1504, the parser execution unit (403) parses the character string s by use of a parser (str1/str2). Or (str1,str2,s) represents processing for parsing the character string s by use of the parser (str1/str2). The parser execution unit (403) checks whether the first character string of the character string s is str1 or str2. If the first character string is str1, the parser execution unit (403) returns, as a parsing result, an abstract syntax tree Rh of the part str1 and the character string excluding str1 from the first character string of the character string s. If the first character string is str2, the parser execution unit (403) returns, as a parsing result, an abstract syntax tree Rh of the part str2 and the character string excluding str2 from the first character string of the character string s.

In Step 1505, the parser execution unit (403) judges whether the parser (str1/str2) cannot accept the character string s, in order to check the result returned in Step 1504. If Rh is not an error, the parser execution unit (403) advances to Step 1506 to extract the abstract syntax tree and the remaining character string from the result returned in Step 1504. If Rh is an error, on the other hand, this means a parsing error, and the parser execution unit (403) advances to Step 1507. Step 1507 is error processing.

In Step 1506, the parser execution unit (403) extracts an abstract Ah1 and the remaining character string str1 from the result returned in Step 1504. Here, Step 1506 can be omitted since what is only done in this step is to extract the result in Step 1504.

In Step 1508, the parser execution unit (403) extracts a natural language processing function having the name of is-a-NLP from the natural language processing registration store (305). The parser execution unit (403) stores the extracted natural language processing function in a function np.

In Step 1509, the parser execution unit (403) generates a parser function for accepting only a line-feed character string, and then stores the function in a function ret.

In Step 1510, the parser execution unit (403) parses a character string part sr1 from Step 1506 by using Until[np,ret], and then returns an abstract syntax tree R2 as a parsing result.

In Step 1511, the parser execution unit (403) judges whether the parser ret cannot accept the character string part sr1. If R2 is an error, this means that the overall result is a parsing error, and the parser execution unit (403) advances to Step 1507. If R2 is not an error, on the other hand, this means that parsing of this part is successful, and the parser execution unit (403) advances to Step 1512 to advance to the next parsing.

In Step 1512, the parser execution unit (403) extracts an abstract syntax tree Ah2 and sr2 from the result in Step 1510, and then advances to Step 1513.

In Step 1513, the parser execution unit (403) restores the character string stored in the variable sr, in the variable s. In addition, the parser execution unit (403) creates an abstract syntax tree (Ah) by combining the abstract syntax tree (Ah1) from Step 1506 and the abstract syntax tree (Ah2) from Step 1512 by a root seq.

Steps 1514 to 1518 show processing for parsing the part (·[is-a-NLP]U<line feed>)+ in 1304 in FIG. 13.

In Step 1514, the parser execution unit (403) initializes the variable i representing the number of ·[is-a-NLP]U<line feed> which have been processed.

In Step 1515, the parser execution unit (403) parses the character string part s from Step 1513 by using Until[np,ret], and returns an abstract syntax tree R as a parsing result.

In Step 1516, the parser execution unit (403) judges whether or not the character string s can be parsed by using Until[np,ret]. If R is an error, this means that the entire result is a parsing error, and the parser execution part (403) advances to Step 1507. If R is not an error, on the other hand, this means that the parsing of this part is successful, and the parser execution unit (403) advances to Step 1517 to advance to the next parsing.

In Step 1517, the parser execution unit (403) adds 1 to the variable i. Moreover, the parser execution unit (403) returns, as a parsing result, an abstract syntax tree Ai and the remaining character string s from the parsing result R in Step 1515.

In Step 1518, the parser execution unit (403) judges whether s is only a blank character. The parser execution unit (403) returns to Step 1515 if s is not only a blank character, while advancing to Step 1519 if s is only a blank character.

In Step 1519, the parser execution unit (403) creates an abstract syntax tree (Ac) by using A1, . . . , Ai from Step 1517 as child nodes and combining them by using a root rep. Moreover, the parser execution unit (403) creates an abstract syntax tree (AR) by using the abstract syntax tree (Ah) from Step 1513 and the abstract syntax tree (Ac) from Step 1519 as child nodes and combining them with a root seq.

In Step 1520, if the parsing is successful, the parser execution unit (403) returns, as a parsing result, the abstract syntax tree (AR) from Step 1519.

In Step 1521, the parser execution unit (403) terminates the parsing processing by the parser combination.

Figure 16:
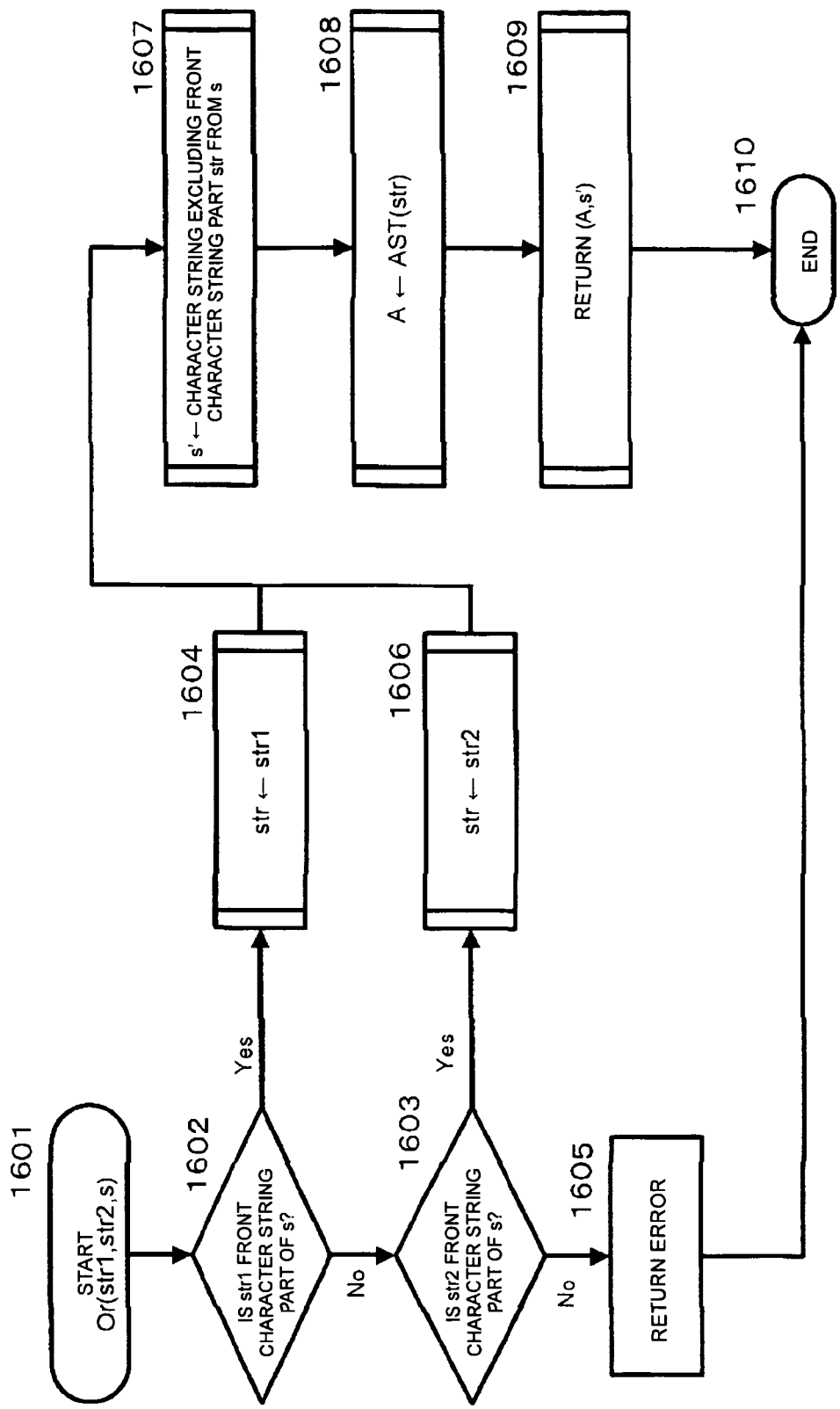
FIG. 16 illustrates a flowchart of a subroutine in Step 1504 in the flowchart shown in FIG. 15.

FIG. 16 shows a flowchart of the subroutine in Step 1504 in the flowchart shown in FIG. 15.

In Step 1601, the parser execution unit (403) starts the processing Or(str1,str2,s).

In Step 1602, the parser execution unit (403) checks whether str1 is a front character string part of s. The parser execution unit (403) advances to Step 1603 if str1 is not a front character string part of s, while advancing to Step 1604 if str1 is a front character string part of s.

If str 1 is a front character string part of s, the parser execution unit (403) stores str1 in str in Step 1604.

In Step 1603, the parser execution unit (403) advances to 1605 if str2 is not a front character string part of s, while advancing to 1606 if str2 is a front character string part of s.

If str2 is a front character string part of s, the parser execution unit (403) stores str2 in str.

In Step 1605, on the basis of the fact that str2 is not a front character string part of s, the parser execution nit (403) performs error processing, and then advances to Step 1610.

In Step 1607, the parser execution unit (403) stores, in s', a character string part obtained by excluding the front character string part str from s.

In Step 1608, the parser execution unit (403) creates a syntax tree A of the front character string part str.

In Step 1609, the parser execution unit (403) returns the syntax tree A from Step 1608 and the character string s' from Step 1607. Thereafter, in Step 1506 in FIG. 15, the character string s' is substituted for sr1.

In Step 1610, the parser execution unit (403) terminates the processing Or(str1,str2,s).

Example 1 is described below.

Figure 17:
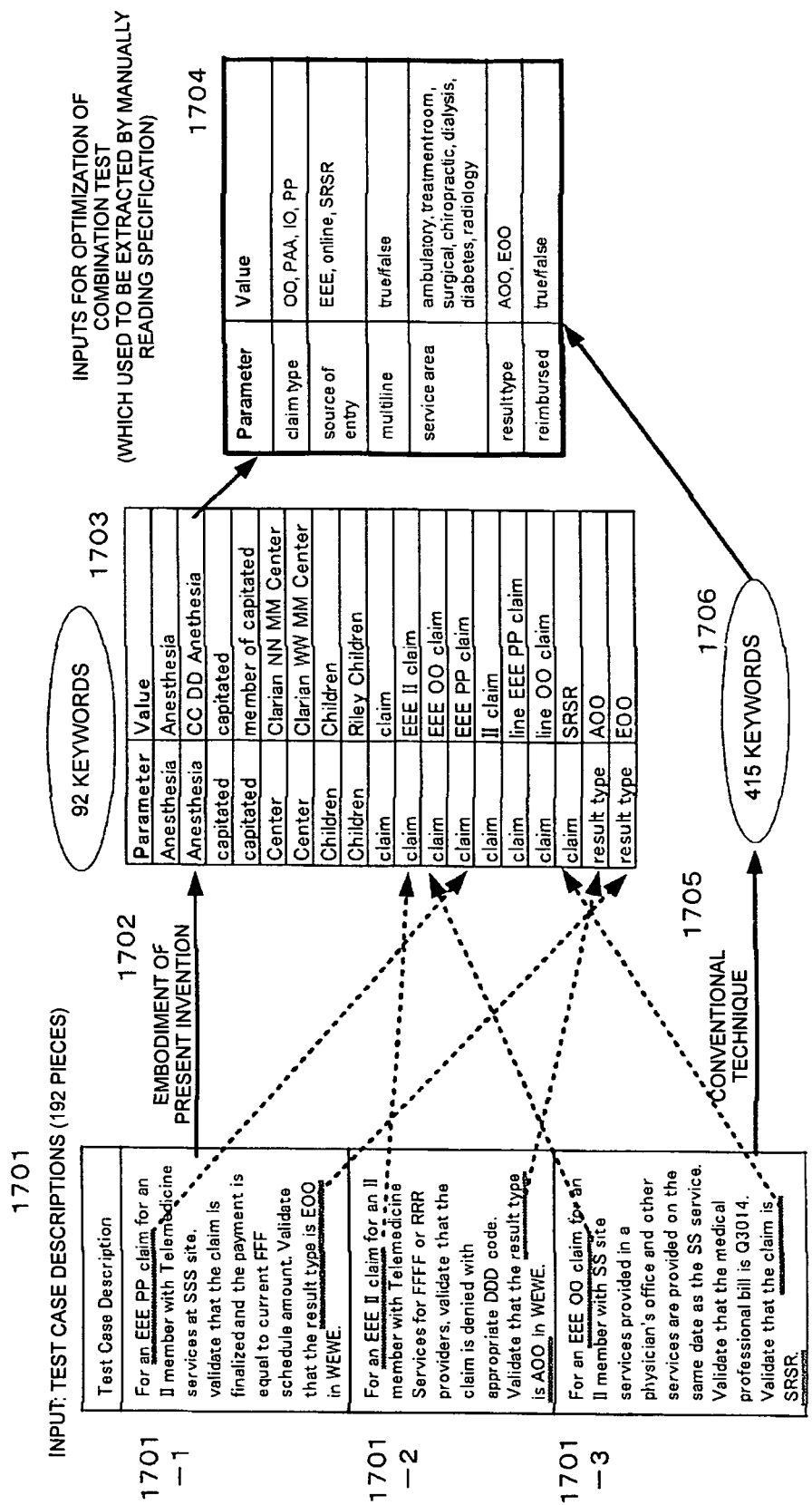
FIG. 17 illustrates an example of performing optimization of a combination test by parsing test case description data by using a parser combination according to an embodiment of the present invention, and then extracting parameter names and values corresponding thereto.

FIG. 17 shows an example in which a combination test optimization is performed by parsing test case description data by use of a parser combination according to the embodiment of the present invention and thereby obtaining parameter names and values corresponding thereto.

Here, a combination test is to test all possible combinations of parameter names and values. In Example 1, the purpose is to collect values to be combined respectively with parameters from a document (test case description data).

Table 1701 shows an example of the test case description data. Here, 192 test case descriptions are prepared (1701-1, 1701-2, 1701-3 . . . , 1701-192). Each test case description has a similar data structure.

A user creates a declarative description including multiple grammar descriptions according to the embodiment of the present invention as follows. The created declarative description includes a grammar description showing application of a combination of a natural language processing function and a formal language processing parser. In the declarative description, the top level of the grammar description is ";".

(Combination of Multiple Grammar Descriptions)

S::=[(For keyword-NLP)?]U (validate/validate that);[is-a-NLP]U eoi

The combination S of multiple grammar descriptions describes that a natural language processing "keyword-NLP" is included after a formal language processing "For", a formal language processing "validate" and "validate that" are then included, and further a natural language processing "is-a-NLP" is applied thereafter. In the grammar description combination S, adequate NLPs are applied respectively to appropriate parts on the basis of knowledge of test case descriptions.

Then, a parser combination (code) s according to the embodiment of the present invention is generated by using the grammar description combination S, and the parser combination (code) s is converted into an executable code by a compiler.

Each of the test case descriptions (1701-1, 1701-2, 1701-3, . . . , 1701-192) is parsed by using the executable code (1702). Through this parsing, parameter names and values corresponding thereto can be extracted only from specific contexts in the test case descriptions. In this way, values indicating parameters to be used in the test can be collected.

As a result, 92 pairs of parameter names and values are obtained. Table 1703 shows the result obtained by sorting the collected values according to the endmost words in the values. Referring to the table 1703 facilitates defining parameter values for the combination test. Arrows with broken lines are shown between Table 1701 and Table 1703 to indicate the parts of the test case descriptions from which the parameters and values corresponding thereto are extracted. Then, Table 1704 is newly created by classifying the values under the parameter values in Table 1703. Table 1704 shows an example of a combination test optimization input.

Keywords are extracted by applying parsers according to a conventional technique to each of the test case descriptions (1701-1, 1701-2, 1701-3, . . . , 1701-192) (1705). Here, the conventional technique is a method for applying an is-a-NLP (a processing function for extracting an is-a relationship) and a keyword-NLP (a processing function for extracting a specific keyword) to the entire test case description. As a result, 415 pairs of parameter names and values are obtained (1706). Then, Table 1704 is newly created by classifying the values under the parameter values.

In the case of applying a parser combination created according to the embodiment of the present invention, it is possible to describe a grammar description so as to use exiting parsers. For this reason, language processing parsers do not need to be customized for each extraction purpose.

In the case of using the existing technique, on the other hand, language processing parsers need to be customized for each extraction purpose. Accordingly, the cost for customizing language processing parsers can be reduced or cut down by using a parser combination created according to the embodiment of the present invention.

Moreover, in the case of applying a parser combination created according to the embodiment of the present invention, the number of keywords to be extracted is smaller than in that in the case of applying existing parsers. Accordingly, the cost for creating Table 1704 on the basis of the extracted keywords can be reduced or cut down. Furthermore, in the case of applying a combination parser created according to the embodiment of the present invention, targets can be narrowed down while including necessary information. Accordingly, the amount of work for creating a model can be reduced.

Example 2 is described below.

Figure 18:
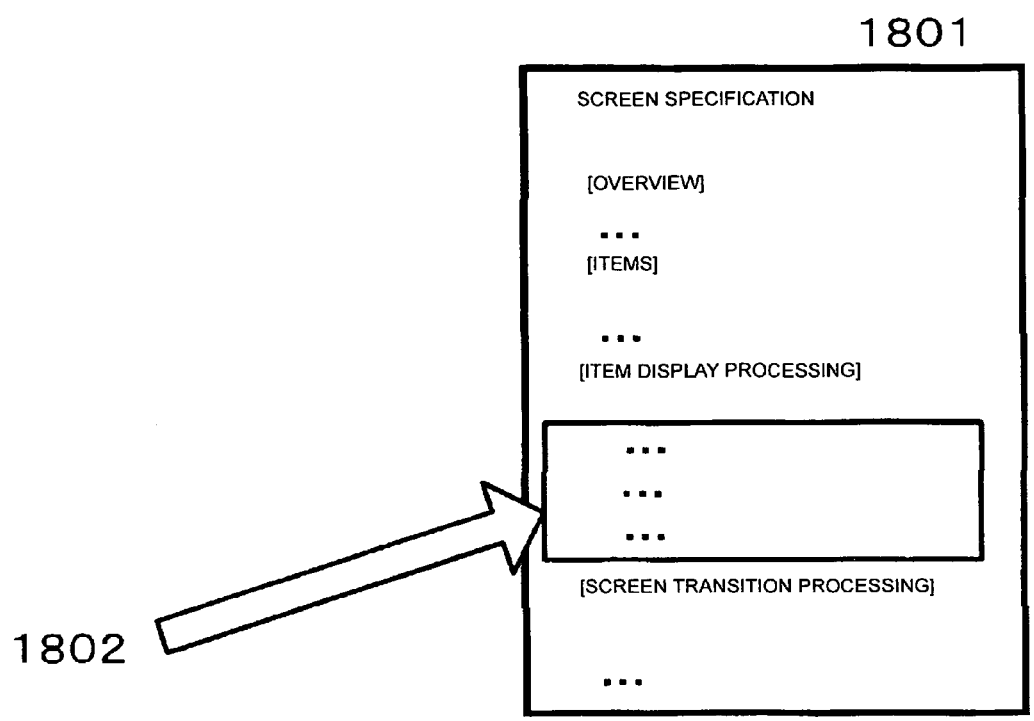
FIG. 18 illustrates an example of a screen specification for showing that parsing only a specific description part is made possible, according to an embodiment of the present invention.

FIG. 18 shows an example of a screen specification for showing that parsing only a specific part is possible according to the embodiment of the present invention. In the following, [ ] are used for solid parentheses with corners.

A screen specification 1801 is described in an XML format. Assume that a user desires to parse only the part included under bracketed [item display processing] and indicated by 1802 in the screen specification 1801. A parser <item-process> which returns an abstract syntax tree including a result of parsing only the part indicated by 1802 is described as follows.

<item-process>::={ ◊ [item display processing]}; FD;{ [screen transition processing]}
where a parser ◊ FP is (∈ U FP),
a parser {FP} is (∈ F FP), and
a parser FD is a formal language processing parser for parsing the part 1802.

◊ FP is a grammar description for ignoring and discarding a part before a part for which FP is successful (i.e., before [item display processing]) and parsing the part for which FP is successful. In the above example, ◊ FP corresponds to [item display processing].

The parser {FP} is a grammar description for performing parsing by using FP, and for discarding AST corresponding to a parsing result. In the above example, {FP} corresponds to [screen transition processing]. Accordingly, in the case of {[screen transition processing]}, the parser {FP} discards AST corresponding to the part [screen transition processing] of the parsing result.

As described above, it is possible to parse only a specific part of a text and thereby extract an abstract syntax tree corresponding to the part, in the embodiment of the present invention.

By contrast, in the case of using conventional grammar descriptions, it is not possible to parse only a specific part of a text and then extract an abstract syntax tree corresponding to the part, since the entire text is a parsing processing target. For this reason, in such a case, an abstract tree for the specific part needs to be created by processing the parsing result by using another program.

The embodiment shown in FIG. 18 can also be applied when the text is an XML document, or a patent, design or trademark application document, for example.

Example 3 is described below.

FIG. 19 shows a table for describing a case in which a specific description part in a specific design document for a project is parsed according to the embodiment of the present invention.

FIG. 19 shows grammars for forms used in an item display processing part in a screen specification, which is the specific design document of the project. In the table, descriptions of examples are omitted.

Assume that it is desired to obtain a pair (condition, result) if possible by analyzing parts B in the forms by using natural language processing.

Assume that it is desired to obtain a pair (item, value) if possible by analyzing parts C and R in the forms by using natural language processing.

If all the parts B, C and R need to be written formally, programming therefore requires a lot of work. To address this problem, a declarative description is created by using grammar descriptions according to the embodiment of the present invention, in order to enable application of exiting natural language processing according to the embodiment of the present invention. Thereby, a parser combination is automatically generated by using the created declarative description.

By parsing the design document shown in FIG. 9 by using the above parser combination, the number of patterns necessary for the screen specification can be as little as 20. In addition, it is not necessary to create a different program for abstract syntax tree processing in order to apply a natural language processing function to a part which cannot be processed by a PEG.

A Comparative Example is provided below.

In the case of writing the parts B, C and R in the forms, the number of patterns to be written is approximately 50 to 60 (although the patterns do not include all the patterns which are reasonably considered as natural sentences in the corresponding parts).

In the case of using a natural language processing function in a method according to exiting PEGs, on the other hand, the number of extracted patterns to be written is approximately 20. However, in this case, programming for processing for an abstract syntax tree of the parsing result is required additionally, and this programming is necessary for each extracted pattern. The abstract syntax tree processing includes extraction of necessary parts based on tree matching or the like, and natural language processing on necessary parts.

As described above, the method according to the conventional technique requires effort for formally writing all the texts including natural sentences, and causes the difficulty in creating parts other than patterns due to the facts that forms can be different according to designs and that changes frequently happen in specific forms to be used for a design document or a requirement document or forms for formal parts such as a template.

Example 4 is provided below.

Figure 20:
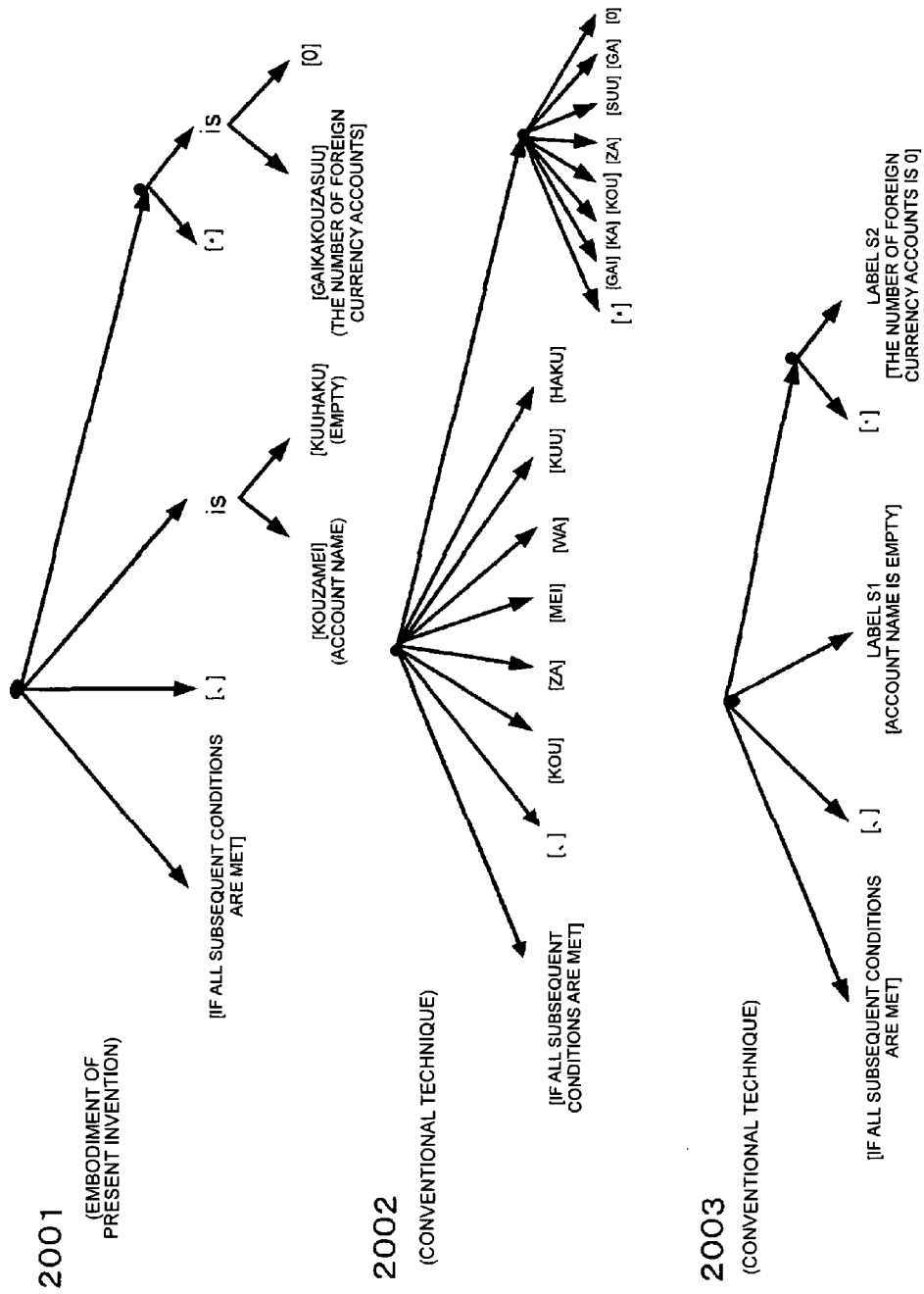
FIG. 20 illustrates an example of an abstract syntax tree generated by using a parser combination generated on the basis of the newly added grammar descriptions shown in FIG. 6.

FIG. 20 shows an example of an abstract syntax tree generated by use of a parser combination generated on the basis of the extended grammar descriptions according to the embodiment of the present invention.

In the case of only using conventional PEGs, it is not possible to explicitly specify, in grammars, parts to be parsed by processing different from parsing using PEGs (such different processing can be existing natural language processing having no Accept Language, for example).

However, according to the embodiment of the present invention, it is possible to explicitly specify, in grammars, the parts to be parsed by using the different processing. In other words, it is possible to skip parts not to be parsed by the different processing.

An abstract syntax tree 2001 is generated as a result of processing by a parser combination according to the embodiment of the present invention. An example of the parser combination is as follows:

<Result-And-Conditions>::=
(if all the subsequent conditions are met/if all the following conditions are met), ((!<line feed>).)*<line feed>
(·((!<line feed>).)*<line feed>)+

The parts ((!<line feed>).)*(two parts) are descriptions for explicitly specifying a part to be skipped by negative look ahead or the like. Here, "." means any character.

In the abstract syntax tree 2001, a tree including a result of processing for parts which a formal language part does not accept can be obtained directly. Hence, processing can be performed with little effort according to an analysis target, in the embodiment of the present invention.

(Another Comparative Example is provided below).

An abstract syntax tree 2002 is generated as a result of processing by a parser based on exiting PEG forms. In the case of the abstract syntax tree 2002, a syntax tree including the parts desired to be skipped is outputted since the formal language processing parser parses the entire input character string (2002).

In order to appropriately process the parts desired to be skipped, processing using exiting PEG forms needs to be created additionally.

As Processing 1, labels are given by pattern matching in consideration of the syntax tree structure and character strings (2003). In Processing 1, it is complicated to individually define patterns of the parts desired to be skipped and matching patterns by processing other than that using PEGs so that the patterns can be appropriately engaged with the grammars, and also the patterns of the parts desired to be skipped and the matching patterns by processing other than that using PEGs tend to be complicated.

As Processing 2, a natural language processing function is applied to a label S1, and further a natural language processing function is applied to a label S2.

Figure 21:
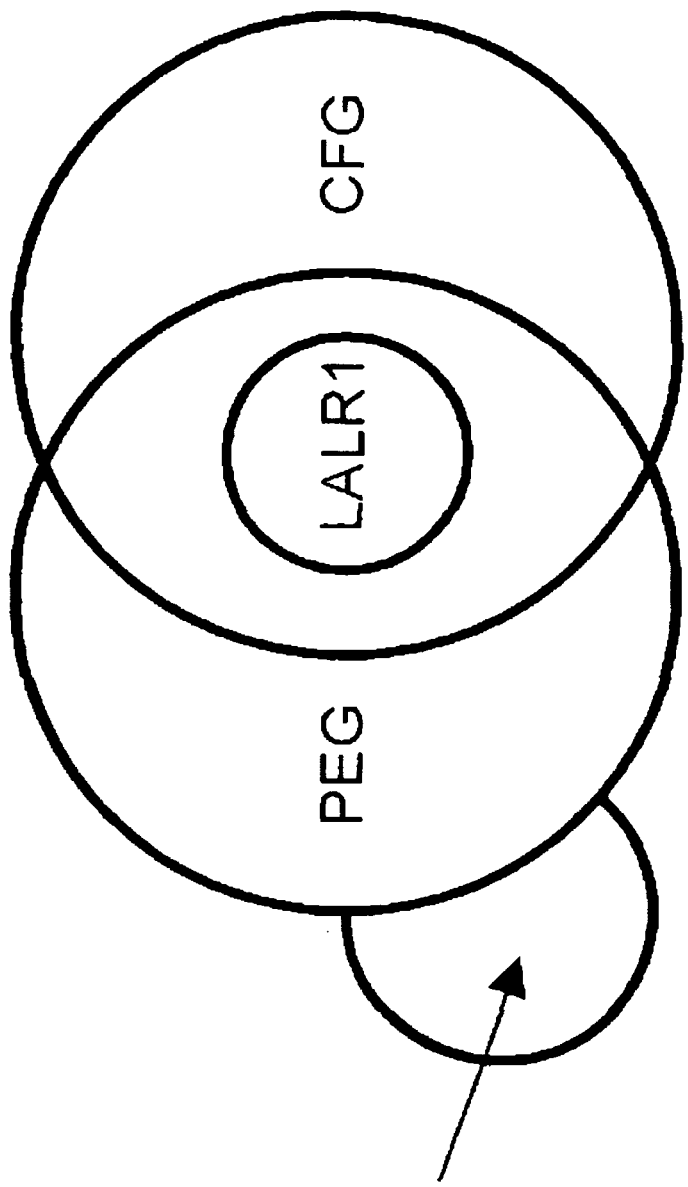
FIG. 21 illustrates a relationship in descriptive power between existing grammar descriptions PEGs shown in FIG. 5 and the grammar descriptions newly added in an embodiment of the present invention shown in FIG. 6.

FIG. 21 shows a relationship in grammatical descriptive power between the existing grammar descriptions PEGs (FIG. 5) and the grammar descriptions (FIG. 6) newly added in the embodiment of the present invention.

In the embodiment of the present invention, grammar descriptions called PEGs can be used. These grammars describe a procedure of processing by a parser. The following characteristics are obtained by describing grammars in PEG forms.

(1) It is proved that, if grammars are described in PEG forms, a result of parsing by use of a parser generated on the basis of the grammars is always determined uniquely, which prevents a problem such as shift/reduce conflict.

(2) It is proved that grammars which can be described by using PEGs cover grammars which can be dealt with an LALR(1) parser. LALR(1) is an ordinary LALR parser, and is a combination of a lexical analysis using regular expressions and a LALR parser with one-look ahead token.

In FIG. 21, CFG indicates Context Free Grammar.

In the embodiment of the present invention, when a set of rules is extended according to PEG forms, the extended (added) grammar descriptions are extended while having the above characteristics (1) and (2).

What is claimed is:

1. A computer-implemented method for generating a parser combination by combining at least two language processing parsers comprising at least one formal language processing parser and one natural language processing parser, the method comprising steps of:
   obtaining a declarative description including a plurality of grammar descriptions generated based on characteristics of target text;
   dynamically generating a parser combination to selectively parse parts of target text with different parsers by combining parsers each associated with at least one of the plurality of grammar descriptions, wherein the generating is carried out using (i) at least one grammar description means and (ii) a computer device, wherein the at least one grammar description means is one of: (i) a grammar description type 1 P1 until P2 (P1 U P2) means to parse input character strings by use of a first parser associated with a first grammar description (P1) until finding at least one input character string first acceptable by a second parser associated with a second grammar description (P2) which is parsed by use of the second parser, and (ii) a grammar description type 2 P1 for P2 (P1 F P2) means to parse input character strings in such a manner that a prefix string of input character strings which are acceptable by the second parser associated with the second grammar description (P2), is cut out and stored, the acceptable input character strings are parsed by use of the second parser, and the cut out and stored prefix string is parsed by use of the first parser associated with the first grammar description (P1).

2. The method according to claim 1, wherein the grammar description type 1 (P1 U P2) means is such that the at least one input character string first acceptable by the second parser is preceded by a first input of an input character string.

3. The method according to claim 2, further comprising the steps of:
   receiving a declarative description including a plurality of grammar descriptions; and
   identifying a combination of grammar descriptions of those described in the received declarative description by parsing the declarative description, wherein the grammar descriptions include at least one of the grammar description types 1 (P1 U P2) and 2 (P1 F P2), wherein, in the step of generating a parser combination, a parser combination is generated by combining parsers associated, respectively, with the grammar descriptions identified in the identifying step.

4. The method according to claim 3, wherein, in the grammar description type 1 (P1 U P2) or the grammar description type 2 (P1 F P2), one of the first grammar description (P1) and the second grammar description (P2) describes a character string processing function which does not have any accept language while accepting and parsing all input character strings, wherein the function describing grammar description is referred to as grammar description N.

5. The method according to claim 4, wherein, in the grammar description N, the character string processing function is a natural language processing function.

6. The method according to claim 3, wherein, in the grammar description type 1 (P1 U P2) or the grammar description type 2 (P1 F P2), one of the first grammar description (P1) and the second grammar description (P2) describes a character string processing function which does not have any accept language while accepting and parsing all input character strings, wherein the function describing grammar description is referred to as grammar description N, and wherein grammar description N describes a natural language processing parser.

7. The method according to claim 6, wherein, in the grammar description N, the character string processing function is a natural language processing function.

8. The method according to claim 3, wherein, in the grammar description type 2 (P1 F P2), at least one input character string is the longest one of the character strings, wherein the at least one input character string is acceptable by the second grammar description (P2).

9. The method according to claim 3, wherein the identifying step includes identifying a top-level combination of grammar descriptions in the declarative description.

10. The method according to claim 9, further comprising the step of: parsing, after the top-level combination of grammar descriptions is identified, at least one of the grammar descriptions of the identified combination, thereby further identifying a combination of grammar descriptions included in the at least one of the grammar descriptions.

11. The method according to claim 1 further comprising the steps of:
receiving data from which information is to be extracted;
finding, from the data, a character string part acceptable by the second parser associated with the second grammar description (P2), by use of the second parser;
parsing a character string part of the data by use of the first parser associated with the first grammar description (P1);
parsing the found character string part by use of the second parser;
creating a syntax tree on the basis of a first analysis result obtained by the parsing done by the first parser and a second analysis result obtained by the parsing performed by the second parser; and
wherein all the steps of the method are carried out using the computer device.

12. The method according to claim 1 further comprising the steps of:
receiving data to be checked;
finding, from the data, at least one character string part by use of the second parser, wherein the one character string part is acceptable by the second parser associated with the second grammar description (P2);
parsing the found character string part by use of the first parser associated with the first grammar description (P1);
creating a syntax tree on the basis of a first analysis result obtained by the parsing done by the first parser; and
wherein all the steps of the method are carried out using the computer device.

13. A computer system for generating a parser combination by combining at least two language processing parsers comprising at least one formal language processing parser and one natural language processing parser, the computer system comprising:
a processor;
a memory connected to the processor; and
a parser generator for obtaining a declarative description including a plurality of grammar descriptions generated based on characteristics of target text and dynamically generating a parser combination in the memory to selectively parse parts of target text with different parsers by combining parsers each associated with at least one of the plurality of grammar descriptions, and at least one grammar description type means, wherein the at least one grammar description means is selected from the group consisting of: (i) a grammar description type 1 P1 until P2 (P1 U P2) means to parse input character strings by use of a first parser associated with a first grammar description (P1), until finding at least one input character string first acceptable by a second parser associated with a second grammar description (P2) which is parsed by use of the second parser, and (ii) a grammar description type 2 P1 for P2 (P1 F P2) means to parse input character strings in such a manner that a prefix string of input character strings which are acceptable by the second parser associated with the second grammar description (P2), is cut out and stored, the acceptable input character strings are parsed by use of the second parser, and the cut out and stored prefix string is parsed by use of the first parser associated with the first grammar description (P1).

14. The computer system according to claim 13, wherein the grammar description type 1 (P1 U P2) means is such that the at least one input string first acceptable by the second parser is preceded by a first input of an input character string.

15. The computer system according to claim 13, wherein the computer system further comprises:
an editing unit for describing a declarative description including multiple grammar descriptions; and
an interpretation unit for identifying a combination of grammar descriptions included in the declarative description by parsing the declarative description, wherein the grammar descriptions include at least one of the grammar description types 1 (P1 U P2) and 2 (P1 F P2);
wherein the parser generator generates a parser combination by combining parsers associated, respectively, with the grammar descriptions identified by the interpretation unit.

16. The computer system according to claim 15, wherein, in the grammar description type 1 (P1 U P2) or the grammar description type 2 (P1 F P2), one of the first grammar description (P1) and the second grammar description (P2) is a character string processing function which does not have any accept language while accepting and parsing all input character strings, wherein the function describing grammar description is referred to as grammar description N.

17. The computer system according to claim 15, wherein, in the grammar description type 1 (P1 U P2) or the grammar description type 2 (P1 F P2), one of the first grammar description (P1) and the second grammar description (P2) describes a character string processing function which does not have any accept language while accepting and parsing all input character strings, wherein the function describing grammar description is referred to as grammar description N, and wherein grammar description N describes a natural language processing parser.

18. The computer system according to claim 13, wherein, in the grammar description type 2 (P1 F P2), at least one input character string is the longest one of the character strings, wherein the at least one input character string is acceptable by the second grammar description (P2).

19. The computer system according to claim 15, wherein the interpretation unit identifies a top-level combination of grammar descriptions in the declarative description.

20. The computer system according to claim 19, wherein, after identifying the top-level combination of grammar descriptions, the interpretation unit parses at least one of the grammar descriptions of the identified combination and thereby further identifies a combination of grammar descriptions included in the at least one of the grammar descriptions.

21. A non-transitory computer readable storage medium tangibly embodying a computer readable program code having computer readable instructions which, when implemented, cause a computer to carry out the steps of the method according to claim 1.

22. A non-transitory computer readable storage medium tangibly embodying a computer readable program code having computer readable instructions which, when implemented, cause a computer to carry out the steps of the method according to claim 11.

* * * * *